United States Patent
Khoury et al.

(10) Patent No.: US 10,448,111 B2
(45) Date of Patent: Oct. 15, 2019

(54) CONTENT PROJECTION

(71) Applicant: Microsoft Technology Licensing, LLC, Redmond, WA (US)

(72) Inventors: Issa Y. Khoury, Redmond, WA (US); William Scott Stauber, Seattle, WA (US); Petteri Mikkola, Bellevue, WA (US); Giorgio Francesco Sega, Kirkland, WA (US); Keri Kruse Moran, Bellevue, WA (US); Elizabeth Fay Threlkeld, Redmond, WA (US); Ryan Chandler Pendlay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 14/495,158

(22) Filed: Sep. 24, 2014

(65) Prior Publication Data
US 2016/0086581 A1 Mar. 24, 2016

(51) Int. Cl.
*H04N 21/4788* (2011.01)
*G09G 5/14* (2006.01)
(Continued)

(52) U.S. Cl.
CPC ....... *H04N 21/4788* (2013.01); *G06F 3/1454* (2013.01); *G09G 5/14* (2013.01);
(Continued)

(58) Field of Classification Search
CPC .......... H04N 21/4788; H04N 21/4122; H04N 21/41407; H04N 21/43615;
(Continued)

(56) References Cited

U.S. PATENT DOCUMENTS

| 5,880,732 A | 3/1999 | Tryding |
| 6,748,195 B1 | 6/2004 | Phillips |

(Continued)

FOREIGN PATENT DOCUMENTS

| EP | 1942401 | 7/2008 |
| EP | 2000894 | 12/2008 |

(Continued)

OTHER PUBLICATIONS

"Xperia™ Z Experience the best of Sony in a smartphone", Published on: Feb. 17, 2013, pp. 10 Available at: http://www.sony.com.au/microsite/xperia-z/.

(Continued)

*Primary Examiner* — Sahlu Okebato
(74) *Attorney, Agent, or Firm* — NovoTechIP International PLLC

(57) ABSTRACT

One or more techniques and/or systems are provided for content projection. For example, a communication connection may be established between a primary device (e.g., a smart phone) of a user and a secondary device (e.g., a television). The primary device may identify an interest of the user to view content on the secondary device (e.g., photos for a recently attended concert). The primary device may retrieve the content (e.g., local photos on the smart phone and/or photos remotely retrieved from a social network). The primary device may project a rendering of the content onto a secondary display of the secondary device (e.g., the smart phone may send the rendering over the communication connection to the television for display).

18 Claims, 15 Drawing Sheets

(51) Int. Cl.
  *H04N 21/81* (2011.01)
  *H04N 21/442* (2011.01)
  *H04N 21/41* (2011.01)
  *H04N 21/414* (2011.01)
  *H04N 21/436* (2011.01)
  *H04N 21/45* (2011.01)
  *G06F 3/14* (2006.01)

(52) U.S. Cl.
  CPC ... *H04N 21/4122* (2013.01); *H04N 21/41407* (2013.01); *H04N 21/43615* (2013.01); *H04N 21/44222* (2013.01); *H04N 21/4524* (2013.01); *H04N 21/8133* (2013.01)

(58) Field of Classification Search
  CPC ......... H04N 21/44222; H04N 21/4524; H04N 21/8133; G06F 3/1454; G09G 3/14
  USPC .................................. 345/1.2; 348/564, 734
  See application file for complete search history.

(56) References Cited

U.S. PATENT DOCUMENTS

| | | |
|---|---|---|
| 6,856,960 B1 | 2/2005 | Dragosh et al. |
| 6,941,356 B2 | 9/2005 | Meyerson |
| 6,952,676 B2 | 10/2005 | Sherman |
| 6,973,535 B2 | 12/2005 | Bruner et al. |
| 7,345,671 B2 | 3/2008 | Robbin et al. |
| 7,392,193 B2 | 6/2008 | Mault |
| 7,437,183 B2 | 10/2008 | Makinen |
| 7,523,226 B2 | 4/2009 | Anderson et al. |
| 7,574,469 B2 | 8/2009 | Lorencz |
| 7,574,691 B2 | 8/2009 | Freitas et al. |
| 7,716,273 B2 | 5/2010 | Soin et al. |
| 7,840,509 B1 | 11/2010 | Messina |
| 7,937,075 B2 | 5/2011 | Zellner |
| 7,962,552 B2 | 6/2011 | Clark et al. |
| 8,041,296 B2 | 10/2011 | Skog et al. |
| 8,150,945 B2 | 4/2012 | Karaoguz et al. |
| 8,161,403 B2 | 4/2012 | Lyle et al. |
| 8,185,539 B1 | 5/2012 | Bhardwaj |
| 8,194,037 B2 | 6/2012 | Kerr et al. |
| 8,244,288 B2 | 8/2012 | Chipchase |
| 8,354,997 B2 | 1/2013 | Boillot |
| 8,418,072 B1 | 4/2013 | Bauer et al. |
| 8,453,186 B2 | 5/2013 | Roberts et al. |
| 8,462,896 B2 | 6/2013 | Suga et al. |
| 8,504,936 B2 | 8/2013 | Gimpl et al. |
| 8,515,413 B1 | 8/2013 | Schilit et al. |
| 8,520,000 B2 | 8/2013 | Duncker et al. |
| 8,520,810 B1 | 8/2013 | Reding et al. |
| 8,538,324 B2 | 9/2013 | Hardacker et al. |
| 8,538,401 B2 | 9/2013 | Kim et al. |
| 8,549,425 B2 | 10/2013 | Sakamoto |
| 8,711,552 B2 | 4/2014 | Medica et al. |
| 8,736,762 B2 | 5/2014 | Luo et al. |
| 8,762,896 B2 | 6/2014 | Lee et al. |
| 9,081,498 B2 * | 7/2015 | Thorsander ......... G06F 3/04883 |
| 9,357,250 B1 | 5/2016 | Newman et al. |
| 9,395,905 B2 | 7/2016 | Wherry |
| 9,405,459 B2 | 8/2016 | Sirpal et al. |
| 9,448,811 B2 | 9/2016 | Culshaw et al. |
| 9,678,640 B2 | 6/2017 | Stauber et al. |
| 9,721,570 B1 | 8/2017 | Beal et al. |
| 9,769,227 B2 | 9/2017 | Threlkeld et al. |
| 9,860,306 B2 | 1/2018 | Threlkeld et al. |
| 9,912,724 B2 | 3/2018 | Liu et al. |
| 10,025,684 B2 | 7/2018 | Khoury et al. |
| 2002/0054141 A1 | 5/2002 | Yen et al. |
| 2002/0161891 A1 | 10/2002 | Higuchi et al. |
| 2003/0018725 A1 | 1/2003 | Turner et al. |
| 2003/0036927 A1 | 2/2003 | Bowen |
| 2003/0055735 A1 | 3/2003 | Cameron et al. |
| 2003/0055738 A1 | 3/2003 | Alie |
| 2003/0164818 A1 | 9/2003 | Miller-smith |
| 2003/0189597 A1 | 10/2003 | Anderson et al. |
| 2003/0214458 A1 | 11/2003 | Giemborek et al. |
| 2004/0002049 A1 * | 1/2004 | Beavers ................... G09B 5/00 434/350 |
| 2006/0010394 A1 | 1/2006 | Chaudhri et al. |
| 2006/0203758 A1 | 9/2006 | Tee et al. |
| 2006/0236255 A1 | 10/2006 | Lindsay et al. |
| 2007/0083911 A1 | 4/2007 | Madden et al. |
| 2007/0113190 A1 | 5/2007 | Clark et al. |
| 2007/0236475 A1 | 10/2007 | Wherry |
| 2007/0299796 A1 | 12/2007 | Macbeth et al. |
| 2008/0005693 A1 | 1/2008 | Oliver et al. |
| 2008/0036743 A1 | 2/2008 | Westerman et al. |
| 2008/0084400 A1 | 4/2008 | Rosenberg |
| 2008/0226119 A1 | 9/2008 | Candelore et al. |
| 2008/0248834 A1 | 10/2008 | Chatterjee et al. |
| 2008/0250424 A1 | 10/2008 | Brugiolo et al. |
| 2008/0305743 A1 | 11/2008 | Aithal et al. |
| 2008/0305742 A1 | 12/2008 | Basir |
| 2009/0037832 A1 | 2/2009 | Falchuk et al. |
| 2009/0113346 A1 | 4/2009 | Wickramasuriya et al. |
| 2009/0153288 A1 | 6/2009 | Hope et al. |
| 2009/0207097 A1 | 8/2009 | Sherman et al. |
| 2009/0210481 A1 | 8/2009 | Fletcher et al. |
| 2009/0231271 A1 | 9/2009 | Heubel et al. |
| 2009/0307658 A1 | 12/2009 | Freitas et al. |
| 2009/0322693 A1 | 12/2009 | Sasakura |
| 2010/0060588 A1 | 3/2010 | Fong |
| 2010/0064228 A1 | 3/2010 | Tsern |
| 2010/0088100 A1 | 4/2010 | Lindahl |
| 2010/0138780 A1 | 6/2010 | Marano et al. |
| 2010/0211636 A1 | 8/2010 | Starkenburg et al. |
| 2010/0299436 A1 | 11/2010 | Khalid et al. |
| 2010/0304783 A1 | 12/2010 | Logan et al. |
| 2011/0024691 A1 | 2/2011 | French et al. |
| 2011/0033971 A1 | 2/2011 | Koo et al. |
| 2011/0055774 A1 | 3/2011 | Kim et al. |
| 2011/0066971 A1 | 3/2011 | Forutanpour et al. |
| 2011/0126119 A1 | 5/2011 | Young et al. |
| 2011/0130178 A1 | 6/2011 | Shin et al. |
| 2011/0131291 A1 | 6/2011 | Hon-anderson |
| 2011/0154268 A1 | 6/2011 | Trent et al. |
| 2011/0185369 A1 | 7/2011 | Huang |
| 2011/0205159 A1 | 8/2011 | Gates et al. |
| 2011/0209069 A1 | 8/2011 | Mohler |
| 2011/0214162 A1 | 9/2011 | Brakensiek et al. |
| 2011/0221765 A1 | 9/2011 | Nason et al. |
| 2011/0230178 A1 | 9/2011 | Jones et al. |
| 2011/0231550 A1 | 9/2011 | Murray et al. |
| 2011/0231796 A1 | 9/2011 | Vigil |
| 2011/0231853 A1 | 9/2011 | Murray et al. |
| 2011/0246891 A1 | 10/2011 | Schubert et al. |
| 2011/0246904 A1 | 10/2011 | Pinto et al. |
| 2011/0307841 A1 | 12/2011 | Boldyrev et al. |
| 2011/0320535 A1 | 12/2011 | Donaldson |
| 2012/0005013 A1 | 1/2012 | Ramer et al. |
| 2012/0017147 A1 | 1/2012 | Mark |
| 2012/0050183 A1 | 3/2012 | Lee |
| 2012/0054648 A1 | 3/2012 | Morris |
| 2012/0095643 A1 | 4/2012 | Bose et al. |
| 2012/0096167 A1 | 4/2012 | Free et al. |
| 2012/0173983 A1 | 7/2012 | Song |
| 2012/0174155 A1 * | 7/2012 | Mowrey ............ H04N 5/44543 725/40 |
| 2012/0176396 A1 | 7/2012 | Harper et al. |
| 2012/0210266 A1 | 8/2012 | Jiang et al. |
| 2012/0265528 A1 | 10/2012 | Gruber et al. |
| 2012/0266079 A1 | 10/2012 | Lee et al. |
| 2012/0274863 A1 | 11/2012 | Chardon et al. |
| 2012/0282914 A1 | 11/2012 | Alexander |
| 2012/0296919 A1 | 11/2012 | Sinha et al. |
| 2012/0317236 A1 | 12/2012 | Abdo et al. |
| 2013/0018659 A1 | 1/2013 | Chi |
| 2013/0024778 A1 | 1/2013 | Reeves et al. |
| 2013/0027315 A1 | 1/2013 | Teng |
| 2013/0031261 A1 | 1/2013 | Suggs |
| 2013/0050222 A1 | 2/2013 | Moran et al. |
| 2013/0055102 A1 | 2/2013 | Matthews et al. |
| 2013/0057572 A1 | 3/2013 | Anderson et al. |

(56) References Cited

U.S. PATENT DOCUMENTS

| | | |
|---|---|---|
| 2013/0066895 A1 | 3/2013 | Choi et al. |
| 2013/0070844 A1 | 3/2013 | Malladi et al. |
| 2013/0073932 A1 | 3/2013 | Migos et al. |
| 2013/0076591 A1 | 3/2013 | Sirpal et al. |
| 2013/0103770 A1* | 4/2013 | Kamolz .............. H04L 65/4076 709/206 |
| 2013/0109371 A1 | 5/2013 | Brogan et al. |
| 2013/0113993 A1 | 5/2013 | Dagit, III |
| 2013/0135195 A1 | 5/2013 | Josephson et al. |
| 2013/0143529 A1 | 6/2013 | Leppanen |
| 2013/0151989 A1 | 6/2013 | Dent et al. |
| 2013/0167159 A1 | 6/2013 | Ricci et al. |
| 2013/0179838 A1 | 7/2013 | Levee et al. |
| 2013/0187861 A1 | 7/2013 | Lavallee |
| 2013/0204967 A1 | 8/2013 | Seo et al. |
| 2013/0207898 A1 | 8/2013 | Sullivan et al. |
| 2013/0214996 A1 | 8/2013 | Reeves et al. |
| 2013/0258037 A1 | 10/2013 | Kim et al. |
| 2013/0276015 A1 | 10/2013 | Rothschild et al. |
| 2013/0276030 A1 | 10/2013 | Fujimoto |
| 2013/0278484 A1 | 10/2013 | Hwang et al. |
| 2013/0283193 A1 | 10/2013 | Griffin |
| 2013/0283213 A1 | 10/2013 | Guendelman et al. |
| 2013/0288603 A1 | 10/2013 | Iwasaki |
| 2013/0326583 A1 | 12/2013 | Freihold et al. |
| 2013/0328667 A1 | 12/2013 | Kumar et al. |
| 2013/0332172 A1 | 12/2013 | Prakash et al. |
| 2013/0332846 A1 | 12/2013 | Freedman |
| 2013/0335340 A1 | 12/2013 | Smith |
| 2013/0347018 A1 | 12/2013 | Limp et al. |
| 2014/0022192 A1 | 1/2014 | Hatanaka |
| 2014/0026068 A1 | 1/2014 | Park et al. |
| 2014/0028918 A1* | 1/2014 | Kim .................... H04N 5/4403 348/564 |
| 2014/0028921 A1 | 1/2014 | Moon et al. |
| 2014/0045433 A1 | 2/2014 | Kim |
| 2014/0051408 A1 | 2/2014 | Jenzowsky et al. |
| 2014/0098182 A1 | 4/2014 | Kramarenko et al. |
| 2014/0118222 A1 | 5/2014 | Barrett et al. |
| 2014/0129695 A1 | 5/2014 | Yerli |
| 2014/0164312 A1 | 6/2014 | Lynch et al. |
| 2014/0173529 A1 | 6/2014 | Hicks |
| 2014/0181639 A1 | 6/2014 | Lund et al. |
| 2014/0181715 A1 | 6/2014 | Axelrod et al. |
| 2014/0201636 A1 | 7/2014 | Freitas et al. |
| 2014/0215347 A1 | 7/2014 | Lin |
| 2014/0218289 A1 | 8/2014 | Dai et al. |
| 2014/0229858 A1 | 8/2014 | Bleker et al. |
| 2014/0244266 A1 | 8/2014 | Brown et al. |
| 2014/0244712 A1 | 8/2014 | Walters et al. |
| 2014/0244782 A1 | 8/2014 | Beaurepaire et al. |
| 2014/0249821 A1 | 9/2014 | Kennewick et al. |
| 2014/0267074 A1 | 9/2014 | Balci et al. |
| 2014/0282103 A1 | 9/2014 | Crandall |
| 2014/0304019 A1 | 10/2014 | Scott |
| 2014/0350936 A1 | 11/2014 | Kanai |
| 2014/0365336 A1 | 12/2014 | Hurewitz |
| 2015/0011277 A1 | 1/2015 | Wakeford et al. |
| 2015/0025976 A1* | 1/2015 | Guo ................... G06Q 30/0267 705/14.64 |
| 2015/0061842 A1 | 3/2015 | Yoon et al. |
| 2015/0066897 A1* | 3/2015 | Vronay ............. G06F 17/30029 707/710 |
| 2015/0138213 A1 | 5/2015 | Turner et al. |
| 2015/0169550 A1 | 6/2015 | Cvijetic et al. |
| 2015/0177860 A1 | 6/2015 | Imai |
| 2015/0234856 A1* | 8/2015 | Havekes .......... G06F 17/30165 707/781 |
| 2015/0268807 A1 | 9/2015 | Truong et al. |
| 2015/0324067 A1 | 11/2015 | Cabral |
| 2015/0355715 A1 | 12/2015 | Smith |
| 2015/0355955 A1 | 12/2015 | Chakra et al. |
| 2015/0371364 A1 | 12/2015 | Park |
| 2015/0373065 A1 | 12/2015 | Holmquist et al. |
| 2016/0070461 A1 | 3/2016 | Herbordt et al. |
| 2016/0070580 A1 | 3/2016 | Johnson et al. |
| 2016/0085396 A1 | 3/2016 | Pendlay et al. |
| 2016/0085430 A1 | 3/2016 | Moran et al. |
| 2016/0085439 A1 | 3/2016 | Threlkeld et al. |
| 2016/0085654 A1 | 3/2016 | Khoury et al. |
| 2016/0085698 A1 | 3/2016 | Mikkola et al. |
| 2016/0088040 A1 | 3/2016 | Threlkeld et al. |
| 2016/0088060 A1 | 3/2016 | Rahman et al. |
| 2016/0162151 A1 | 6/2016 | Xu |
| 2016/0261921 A1 | 9/2016 | Malko |
| 2016/0267546 A1* | 9/2016 | Marsh ................ G06Q 30/0269 |
| 2018/0007104 A1 | 1/2018 | Threlkeld et al. |
| 2018/0300213 A1 | 10/2018 | Khoury et al. |

FOREIGN PATENT DOCUMENTS

| | | |
|---|---|---|
| EP | 2509292 | 10/2012 |
| EP | 2632131 | 8/2013 |
| EP | 2701044 | 2/2014 |
| EP | 2712152 | 3/2014 |
| FR | 2996086 | 3/2014 |
| RU | 2355121 | 5/2009 |
| RU | 2405186 | 11/2010 |
| RU | 2417391 | 4/2011 |
| RU | 2011146922 | 7/2013 |
| WO | WO 2009143294 | 11/2009 |
| WO | WO 2013112143 | 8/2013 |
| WO | WO 2013171487 | 11/2013 |
| WO | WO 2013184394 | 12/2013 |
| WO | WO 2014038918 | 3/2014 |

OTHER PUBLICATIONS

"iDisplay extra monitor for your Mac or PC", Published on: Nov. 1, 2013, pp. 3 Available at: http://getidisplay.com/.

Dachis, Adam, "How to Automatically Unlock Your Gadgets without a Password", Published on: Jun. 7, 2013, pp. 17, Available at: http://lifehacker.com/how-to-make-your-smartphone-automatically-unlock-your-s-510592193.

Examination Report received in European Patent Application No. 15775849.1, dated Oct. 16, 2018, 6 pages.

Examination Report received in European Patent Application No. 15775852.2, dated Sep. 3, 2018, 6 pages.

Examination Report received in European Patent Application No. 15779064.3, dated Aug. 24, 2018, 5 pages.

"Bimodal tablets (Windows and Android)", Retrieved From: http://getwired.com/2014/01/05/bimodal-tablets-windows-and-android-remember-them-when-theyre-gone-again/, Jan. 14, 2005, 23 Pages.

"Chromecast", Retrieved From: https://web.archive.org/web/20140703072247/http://www.google.com/intl/en/chrome/devices/chromecast/, Retrieved on: Jul. 3, 2014, 6 Pages.

"Considering CarPlay", Retrieved From: http://getwired.com/2014/03/05/considering-carplay/, Mar. 5, 2014, 5 Pages.

"Creating Separate Back Stacks for Android Application Tabs using Fragments", Retrieved From: https://www.abtosoftware.com/blog/creating-separate-back-stacks-for-android-apps-tabs-using-fragments, Apr. 30, 2013, 3 Pages.

"Design A for P2", Retrieved From: https://pyra-handheld.com/boards/threads/design-a-for-p2.69808/, Jan. 15, 2013, 6 Pages.

"In every dual-core phone, there's a PC trying to get out", Retrieved From: https://web.archive.org/web/20130417120250/https://www.ubuntu.com/phone/ubuntu-for-android, Retrieved Date: Sep. 25, 2013, 8 Pages.

"Microsoft SMB Protocol Packet Exchange Scenario", Retrieved From http://web.archive.org/web/20120731231956/https://msdn.microsoft.com/en-us/library/windows/desktop/aa365236(v=vs.85).aspx, Jul. 31, 2012, 3 Pages.

"Providing Proper Back Navigation", Retrieved From: https://developer.android.com/training/implementing-navigation/temporal.html, May 18, 2013, 4 Pages.

"SlingPlayer for Connected Devices", Retrieved from http://forms.sling.com/go/sped, Jun. 25, 2014, 3 Pages.

(56) References Cited

OTHER PUBLICATIONS

"Spring Echo-Dual-Screen Simul-tasking Phone", Retrieved From: http://www.unp.me/f106/sprint-echo-dual-screen-simul-tasking-phone-139170/, Feb. 10, 2011, 3 Pages.
"The PadFone is not the future", Retrieved From: http://getwired.com/2013/04/14/1471/, Apr. 14, 2013, 3 Pages.
"Touch Mouse-iPhone/iPod Touch", Retrieved From: <https://www.youtube.com/watch?v=iCI7iKv91GE>>, Feb. 1, 2010, 5 Pages.
"What is Ubuntu for Android?", Retrieved from https://web.archive.org/web/20140704145730/https://www.ubuntu.com/phone/ubuntu-for-android, Retrieved Date: Jul. 3, 2014, 9 Pages.
"Office Action Issued in European Patent Application No. 15775022.5", dated Jun. 22, 2018, 8 Pages.
"Office Action Issued in European Patent Application No. 15775852.5", dated Apr. 5, 2018, 5 Pages.
"Office Action Issued in European Patent Application No. 15775856.6", dated May 29, 2018, 6 Pages.
Baur, et al., "Virtual Projection: Exploring Optical Projection as a Metaphor for Multi-Device Interaction", In Proceedings of the ACM SIGCHI Conference on Human Factors in Computing Systems, May 5, 2012, pp. 1693-1702, 10 pages.
Borchers, et al., "Stanford Interactive Workspaces: A Framework for Physical and Graphical User Interface Prototyping", In Proceedings of the IEEE Wireless Communications, vol. 9, Issue 6, Dec. 2002, pp. 64-69, 6 pages.
Calvary, et al., "A Unifying Reference Framework for Multi-Target user Interfaces", In Journal of Interacting with Computers, vol. 15, Issue 3, Jun. 1, 2003, pp. 289-308, 20 pages.
Cass, Stephen, "Big fridge is watching you [smart technologies monitoring food from production to consumption]", In Proceedings of the Spectrum, IEEE vol. 50, Issue 6, Jun. 1, 2013, pp. 88, 1 page.
Chang, Alexandra, "Up close with iOS 5: New gestures", Retrieved From: http://www.macworld.com/article/1163019/ios_5_new_gestures.html, Oct. 14, 2011, 4 Pages.
Ciprian, Rusen, "How to Work With Network Drives & Network Locations", Retrieved From https://www.howtogeek.com/school/windows-network-sharing/lesson8/, Apr. 16, 2014, 25 Pages.
Cohen, Peter, "OSX Mavericks Preview: Multiple Displays Finally Work Like They're Supposed To", Retrieved from http://www.imore.com/os-x-mavericks-preview-multiple-displays, Jul. 8, 2013, 8 Pages.
Dachselt, et al., "Throw and Tilt—Seamless Interaction Across Devices Using Mobile Phone Gestures", In Proceedings of the 2nd Workshop on Mobile and Embedded Interactive Systems, Sep. 11, 2008, pp. 272-278, 7 pages.
Etherington, Darrell, "Mosaic Lets You Weave a Single Display From Multiple iPhones and iPads, Offers SDK For Developers", Retrieved From: https://techcrunch.com/2013/04/02/mosaic-lets-you-weave-a-single-display-from-multiple-iphones-and-ipads-offers-sdk-for-developers/, Apr. 2, 2013, 7 Pages.
Greenberg, et al., "PDAs and Shared Public Displays: Making Personal Information Public, and Public Information Personal", In Proceedings of the Personal Technologies, vol. 3, Issue 1, Mar. 1999, pp. 54-64, 11 pages.
Grolaux, et al., "Attach me, Detach me, Assemble me like You Work", In Proceedings of the Human-Computer Interaction, vol. 5, Sep. 12, 2005, pp. 198-212, 5 pages.
Hamblen, Matt, "Google Chromecast controls TV from smartphones, tablets, laptops", Retrieved From: http://www.computerworld.com/article/2484298/tablets/google-chromecast-controls-tv-from-smartphones--tablets--laptops.html, Jul. 24, 2013, 5 Pages.
Hardawar, Devindra, "Kyocera's Echo phone brings dual-screens and "Simul-Tasking" to Sprint", Retrieved From: https://venturebeat.com/2011/02/08/kyocera-echo/, Feb. 8, 2011, 4 Pages.
Heape, Judd, "Driving an External Monitor from Handhelds", In Proceedings of the EE Times-India, Mar. 2008, 2 Pages.
Kernchen, et al., "Multimodal user interfaces for context-aware mobile applications", In Proceedings of the IEEE 16th International Symposium on Personal, Indoor and Mobile Radio Communications, vol. 4, Sep. 11, 2005, pp. 2268-2273, 6 pages.
Kong, et al., "Design of Human-Centric Adaptive Multimodal Interfaces", In International Journal of Human-Computer Studies, vol. 69, Issue 12, Jul. 28, 2011, pp. 854-869, 16 pages.
Korpipaa, et al., "Managing Context Information in Mobile Devices", In Proceedings of the IEEE Pervasive Computing, vol. 2, Issue 3, Jul. 1, 2003, pp. 42-51.
Martin, B R., "Separate Back Stack for Each Lab in Android using Fragments", Retrieved from http://stackoverflow.com/questions/6987334/separate-back-stack-for-each-lab-in-android-using-fragments, May 18, 2013, 17 pages.
Menoo, Schoone, "Sharing files with a mapped network drive", Retrieved From http://www.optimizingpc.com/miscellaneous/sharing_files_shared_folder.html, Feb. 1, 2012, 4 Pages.
Newman, et al., "User Interfaces When and Where They are Needed: An Infrastructure for Recombinant Computing", In Proceedings of the ACM 15th Annual Symposium on User Interface Software and Technology, vol. 4, Issue 2, Oct. 27, 2002, pp. 171-180, 10 pages.
Oremland, Paul, "Building for Multiple Screens", Retrieved From: http://tech.infospace.com/2013/10/18/building-for-multiple-screens/, Oct. 18, 2013, 6 Pages.
"International Preliminary Report on Patentability Issued in PCT Application No. PCT/US2015/048748", dated Oct. 6, 2016, 8 Pages.
"International Search Report & Written Opinion Issued in PCT Application No. PCT/US2015/048748", dated Dec. 11, 2015, 14 Pages.
"Second Written Opinion Issued in PCT Application No. PCT/US2015/048748", dated Jul. 4, 2016, 7 Pages.
"International Preliminary Report on Patentability Issued in PCT Application No. PCT/US2015/050317", dated Dec. 6, 2016, 7 Pages.
"International Search Report and Written Opinion Issued in PCT Application No. PCT/US2015/050317", dated Feb. 16, 2016, 24 Pages.
"Second Written Opinion Issued in PCT Application No. PCT/US2015/050317", dated Aug. 18, 2016, 6 Pages.
"International Preliminary Report on Patentability Issued in PCT Application no. PCT/US2015/050319", dated Jul. 18, 2016, 10 Pages.
"International Search Report & Written Opinion Issued in PCT Application No. PCT/US2015/050319", dated Dec. 3, 2015, 10 Pages.
"Second Written Opinion Issued in PCT Application No. PCT/US2015/050319", dated May 27, 2016, 8 Pages.
"International Search Report & Written Opinion Issued in PCT Application No. PCT/US2015/050664", dated Nov. 27, 2015, 13 Pages.
"Response to Written Opinion Issued in PCT Application No. PCT/US2015/050664", Filed Date: Jun. 22, 2016, 5 Pages.
"Second Written Opinion Issued in PCT Application No. PCT/US2015/050664", dated Sep. 19, 2016, 5 Pages.
"International Preliminary Report on Patentability Issued in PCT Application No. PCT/US2015/050690", dated Dec. 1, 2016, 6 Pages.
"International Search Report & Written Opinion Issued in PCT Application No. PCT/US2015/050690", dated Nov. 25, 2015, 10 Pages.
"Response to Written Opinion Filed in PCT Application No. PCT/US2015/050690", Filed Date: Apr. 8, 2016, 8 Pages.
"Second Written Opinion Issued in PCT Application No. PCT/US2015/050690", dated May 27, 2016, 4 Pages.
"International Preliminary Report on Patentability Issued in PCT Application No. PCT/US2015/050838", dated Dec. 12, 2016, 8 Pages.
"International Search Report & Written Opinion Issued in PCT Application No. PCT/US2015/050838", dated Jan. 13, 2016, 14 Pages.
"Response to Written Opinion Filed in PCT Application No. PCT/US2015/050838", Filed Date: Jun. 24, 2016, 23 Pages.
"Second Written Opinion Issued in PCT Application No. PCT/US2015/050838", dated Sep. 6, 2016, 8 Pages.

(56) References Cited

OTHER PUBLICATIONS

"International Preliminary Report on Patentability Issued in PCT Application No. PCT/US2015/050846", dated Nov. 3, 2016, 8 Pages.
"International Search Report & Written Opinion Issued in PCT Application No. PCT/US2015/050846", dated Jan. 5, 2016, 12 Pages.
"Response to Written Opinion Issued in PCT Application No. PCT/US2015/050846", Filed Date: May 19, 2016, 25 Pages.
"Second Written Opinion Issued in PCT Application No. PCT/US2015/050846", dated Aug. 22, 2016, 6 Pages.
"International Preliminary Report on Patentability Issued in PCT Application No. PCT/US2015/050866", dated Jan. 11, 2017, 13 Pages.
"International Search Report & Written Opinion Issued in PCT Patent Application No. PCT/US2015/050866", dated Jan. 8, 2016, 14 Pages. "Response to Written Opinion Filed in PCT Application No. PCT/US2015/050866", Filed Date: May 2, 2016, 20 Pages.
"Response to Written Opinion Filed in PCT Application No. PCT/US2015/050866", Filed Date: Mar. 18, 2016, 6 Pages.
"Second Written Opinion Issued in PCT Application No. PCT/US2015/050866", dated Aug. 1, 2016, 8 Pages.
"International Preliminary Report on Patentability Issued in PCT Application No. PCT/US2015/051128", dated Dec. 19, 2016, 8 Pages.
"International Search Report & Written Opinion Issued in PCT Application No. PCT/US2015/051128", dated Dec. 2, 2015, 11 Pages.
"Second Written Opinion Issued in PCT Application No. PCT/US2015/051128", dated Sep. 5, 2016, 6 Pages.
"International Preliminary Report on Patentability Issued in PCT Application No. PCT/US2015/051133", dated Dec. 2, 2016, 12 Pages.
"International Search Report & Written Opinion Issued in PCT Application No. PCT/US2015/051133", dated Jan. 13, 2016, 13 Pages.
"Response to Written Opinion Filed in PCT Application No. PCT/US2015/051133", Filed Date: Jul. 22, 2016, 24 Pages.
"Second Written Opinion Issued in PCT Application No. PCT/US2015/051133", dated Sep. 7, 2016, 12 Pages.
"Response to Written Opinion Filed in PCT Application No. PCT/US2015/080846", Filed Date: May 19, 2016, 25 Pages.
Piazza, et al., "Holy Smartphones and Tablets, Batman! Mobile Interaction's Dynamic Duo", In Proceedings of the ACM 11th Asia Pacific Conference on Computer Human Interaction, Sep. 24, 2013, pp. 63-72, 10 pages.
Scheible, et al., "MobiToss: A Novel gesture based interface for creating and sharing mobile multimedia art on large public displays", In Proceedings of the 16th ACM International Conference on Multimedia, Oct. 26, 2008, pp. 957-960, 4 pages.
Schmidt, et al., "A Cross-Device Interaction Style for Mobiles and Surfaces", In Proceedings of the ACM Designing Interactive Systems Conference, Jun. 11, 2012, pp. 318-327, 10 pages.
Schmidt, Albrecht, "Implicit Human Computer Interaction Through Context", In Proceedings of the Personal Technologies, vol. 4, Issue 2, Jan. 1, 2000, pp. 191-199, 9 pages.

Seifert, et al., "Extending Mobile Interfaces with External Screens", In Proceedings of the 14th International Conference on Human-Computer Interaction (Interact), Sep. 2, 2013, pp. 722-729, 8 pages.
Solamalai, et al., "In-Car Entertainment using Mobile Devices: A study on Automotive Manufactures in India", In International Journal of Engineering Science and Technology, vol. 2, Issue 1, Jun. 30, 2014, 4 Pages.
Suk, et al., "Distributed Speech Recognition System for PDA in Wireless Network Environment", In Proceedings of the 9th Conference on Speech and Computer, Sep. 20, 2004, 4 Pages.
Tahir, et al., "ARemote: A Tangible Interface for Selecting TV Channels", In Proceedings of the IEEE 17th International Conference on Artificial Reality and Telexistence, Nov. 28, 2007, pp. 298-299, 2 pages.
Taylor, Nathan, "Multiple TV remotes showcase the evils of complexity. Smart TVs just make it worse", Retrieved From: https://praxtime.com/2014/01/13/multiple-remotes-evil/, Jan. 13, 2014, 4 Pages.
Teng, Albert, "Share Android Device Screen with Other Devices", Retrieved From: https://web.archive.org/web/20170502183134/https://www.youtube.com/watch?v=Ygng30ir1tc, Dec. 17, 2012, 4 Pages.
Thurrott, Paul, "Google I/O 2014: Android Takes the L", Retrieved from: http://winsupersite.com/mobile-devices/google-io-2014-android-takes-1, Jun. 25, 2014, 12 Pages.
Wang, et al., "Dynamic Cloud Resource Reservation via Cloud Brokerage", In Proceedings of the IEEE 33rd International Conference on Distributed Computing Systems, Jul. 8, 2013, pp. 400-409, 10 pages.
Office Action from a counterpart European Patent Application No. 15779062.7 ("Lending Target Device Resources to Host Device Computing Environment"), dated Mar. 15, 2019, 8 Pages.
Notice of Allowance from a counterpart Russian Patent Application No. 2017109699, ("Lending Target Device Resources to Host Device Computing Environment"), dated Mar. 6, 2019, 21 Pages.
Office Action from a counterpart Russian Patent Application No. 2017109689 (Nat'l phase of PCT/US2015/050846, "Presentation of Computing Environment on Multiple Devices") (no translation available) dated Apr. 3, 2019, 5 Pages.
Non-Final Office Action received in U.S. Appl. No. 16/016,244 ("Lending Target Device Resources to Host Device Computing Environment"), dated Mar. 25, 2019, 9 Pages.
Notice of Allowance (w/English translation) received in a counterpart Russian Patent Application No. 2017109690 ("Component-Specific Application Presentation Histories"), dated Apr. 17, 2019, 25 Pages.
Office Action received in European Patent Application No. 15775022.5, "Invocation of a Digital Personal Assistant by Means of a Device in the Vicinity," dated Jan. 16, 2019, 7 pages.
Office Action received in European Patent Application No. 15775852.5, "Presentation of Computing Environment on Multiple Devices," dated Feb. 19, 2019, 6 pages.
Non Final Office Action received in U.S. Appl. No. 14/481,821, "Digital Personal Assistant Remote Invocation," dated Mar. 7, 2019, 23 Pages.

\* cited by examiner

CONTENT PROJECTION

BACKGROUND

Many users may interact with various types of computing devices, such as laptops, tablets, personal computers, mobile phones, kiosks, videogame systems, etc. In an example, a user may utilize a mobile phone to obtain driving directions, through a map interface, to a destination. In another example, a user may utilize a store kiosk to print coupons and lookup inventory through a store user interface.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for content projection are provided herein. In an example of content projection, a primary device establishes a communication connection with a secondary device. The primary device identifies a first current user content interest of a first user of the primary device. The primary device obtains content associated with the first current user content interest. The primary device projects a rendering of the content onto a secondary display of the secondary device.

In an example of content projection, a secondary device establishes a communication connection with a primary device. The secondary device provides a secondary device identifier, identifying the secondary device, to the primary device. A first rendering of content, associated with a first current user content interest of a first user of the primary device, is received from the primary device based upon the secondary device identifier satisfying a projection policy. The first rendering is displayed on a secondary display of the secondary device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
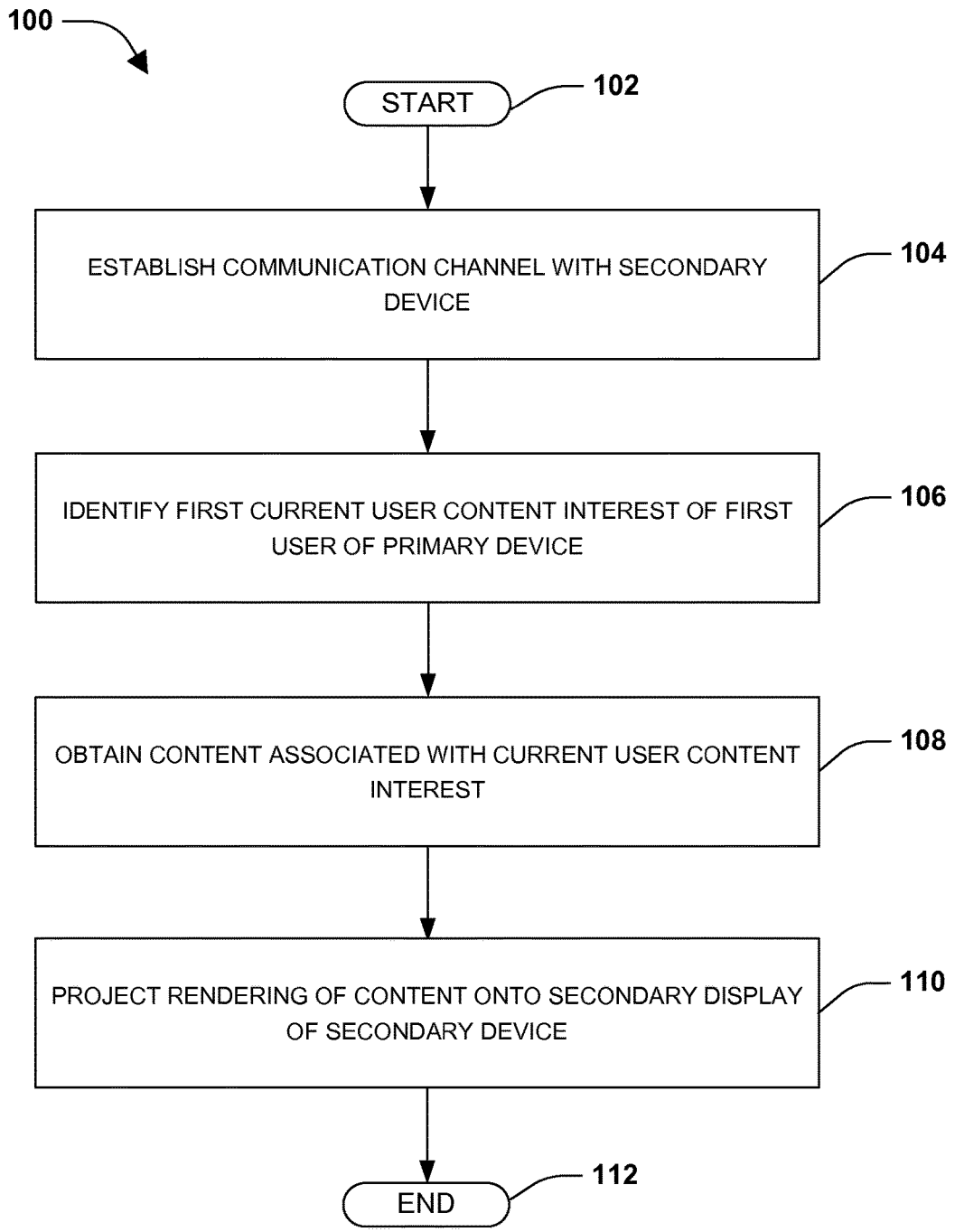
FIG. 1 is a flow diagram illustrating an exemplary method of content projection.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for content projection are provided herein. A user may desire to view interesting content on various devices, such as when a device is in an idle mode. For example, a user may be listening to music of a rock band on a smart phone while riding a bus home. When the user enters her house, she may have an interest in viewing social network information about the rock band on a television in her living room. Unfortunately, the television may lack computing resources (e.g., processing power, memory, etc.) and/or functionality to understand a current user content interest of the user and/or may not have access to the social network information about the rock band. Accordingly, as provided herein, a primary device may identify a current user content interest of a user, and may project a rendering of content, associated with the current user content interest, to a secondary display of a second device. For example, the smart phone may determine that the user might have an interest in viewing the social network information about the rock band on the television. The smart phone may access a rock band social network profile, and may project a rendering of the rock band social network profile on the television display (e.g., the smart phone may locally generate the rendering, and may send the rendering over a communication connection to the television for display on the television display). In this way, content, which may be interesting to the user, may be displayed through a secondary device that may otherwise lack computing resources and/or functionality to identify and obtain such content. The user may take affirmative action, such as providing opt-in consent, to allow access to and/or use of information (e.g., social network posts, calendar entries, photos, messages, a video that the user is currently watching, music that the user is currently listening to, etc.), such as for the purpose of identifying a current user content interest and/or for selectively providing renderings of content on a secondary display (e.g., where the user responds to a prompt regarding the collection and/or use of such information).

An embodiment of content projection is illustrated by an exemplary method 100 of FIG. 1. At 102, the method starts. At 104, a primary device (e.g., smartphone, wearable, etc.) of a first user may establish a communication connection with a secondary device (e.g., a television, an interactive touch display, a laptop, a personal computer, a tablet, an appliance such as a refrigerator, a car navigation system, etc.). For example, a smart phone primary device may establish a communication connection (e.g., a Bluetooth connection) with a television secondary device in the first user's home while the first user is listening on the smart phone primary device to a videogame audio show about an upcoming videogame console. In an example, the communication connection may be established automatically, programmatically, based upon user initiation, etc. At 106, the primary device may identify a first current user content interest of a first user of the primary device. For example, the smart phone primary device may determine that the first user has an interest in viewing videogame preview articles for videogames that will be released with the videogame console based upon the first user listening to the videogame audio show (e.g., the first user may provide the smart phone primary device with permission to evaluate content and/or other user data for the purpose of identifying the first current user content interest).

At 108, the primary device may obtain content associated with the first current user content interest. Content may comprise an image, a video, a website, audio, email content, calendar content, social network content, a file, text, a map, web service result data, an advertisement or other promotional content, weather, a recommendation from a recommendation service, task completion information, a document, etc. In an example, the content may be obtained from local primary storage on the primary device (e.g., the first user may have downloaded a racing videogame preview article; a second user may have emailed a sports videogame preview article to the first user; etc.). In an example, the content may be obtained from a remote source different than the primary device (e.g., a roleplaying videogame preview article may be obtained from a videogame website). In an example, one or more potential content candidates may be identified as candidates for the content. In an example, responsive to potential content exceeding a user sensitivity threshold (e.g., the user may be drafting a secret videogame preview article that is not be shared with anyone), the potential content may be disqualified for identification as the content for display on a secondary display of the secondary device.

At 110, a rendering of the content may be projected onto the secondary display of the secondary device (e.g., the smart phone primary device may locally generate the rendering, and may provide the rendering to the television secondary device for display on a television secondary display). It may be appreciated that in one example, projecting a rendering onto a secondary display may comprise the primary device sending (e.g., "projecting") the rendering over the communication connection to the secondary device for display on the secondary display (e.g., as opposed to a physical projection of light onto a surface of the secondary device). For example, the smart phone primary device may locally generate, on the smart phone primary device, a first rendering of the racing videogame preview article, a second rendering of the sports videogame preview article, and a third rendering of the roleplaying videogame preview article. In an example, the smart phone primary device may sequentially project the first rendering, the second rendering, and/or the third rendering onto the television secondary display (e.g., sequentially send the renderings to the television secondary device for display on the television secondary display). In an example, the rendering is not displayed on a primary display of the primary device (e.g., the projection to the television secondary display is not a mirror of what is displayed on the primary display of the smart phone primary device).

In an example, a projection triggering event may be defined based upon a proximity distance between the primary device and the secondary device, an idle mode of the secondary device (e.g., the television secondary device may be in a standby mode), a user command (e.g., the user may say "project interesting content onto my television"), a location trigger (e.g., the user being at home), etc. Responsive to a triggering of the projection trigger event, the rendering of the content may be projected onto the secondary display (e.g., sent over the communication connection to the television secondary device for display on the television secondary display).

The first user may specify what content may be displayed on particular secondary device at particular times, locations and/or in various situations. For example, a projection policy may be received from the first user. In an example, the projection policy may specify a content type that is allowed or not allowed to be projected onto a device type of the secondary device (e.g., articles, social network notifications, and user images may be allowed to be projected to television secondary devices, but user videos and social network messages may not be allowed to be projected to television secondary devices). In an example, the projection policy may specify that a first type of content is allowed to be projected at a specified time and/or location (e.g., personal emails may be allowed to be projected to work secondary devices during non-working hours, such as from 5:00 pm until 8:00 am, whereas work emails may be allowed to be projected to work secondary devices anytime) and/or that a second type of content is not allowed to be projected at the specified time and/or location (e.g., personal emails may not be allowed to be projected to work secondary devices during working hours, such as from 8:00 am until 5:00 pm). Responsive to a current context (e.g., a secondary device type, a content type of content, a current location, a current time, etc.) satisfying the projection policy, the rendering of the content may be projected onto the secondary display, otherwise the rendering may not be projected.

In an example, the primary device may detect a second primary device of a second user. For example, the smart phone primary device may detect a tablet primary device of a spouse. The smart phone primary device may receive a second current user content interest of the second user from the tablet primary device (e.g., a calendar entry may indicate that the spouse is traveling to Chicago tomorrow). The primary device may collaborate with the second primary device to obtain a set of content associated with the first current user content interest and/or the second current user content interest. For example, the set of content may comprise the racing videogame preview article, the sports videogame preview article, the roleplaying videogame preview article, a Chicago weather forecast, Chicago flight information, a Chicago videogame convention (e.g., shared interest content that corresponds to both the first current user content interest and the second current user content interest), etc. A collaborative rendering of at least some of the set of content may be projected to the secondary display. In an example, the collaborative rendering may comprise a split screen user interface. The split screen user interface comprises a first user interface portion populated with first content, of the set of content, corresponding to the first current user interest of the first user. The split screen user interface comprises a second user interface portion populated with second content, of the set of content, corresponding to the second current user interest of the second user. In an example, the collaborative rendering comprises a slideshow user interface comprising a slide show of the first content for the first user interleaved with the second content for the second user.

In an example, a first display rank may be identified for the first user based upon the first current user content interest and/or other information (e.g., a time at which the smart phone primary device connected to the television secondary device, thus indicating an order with which the first user entered the living room, such as relative to the spouse; a time span over which the first user has current priority to display renderings on the television secondary display, such as relative to the spouse; a number of renderings displayed on the television secondary display by the first user; etc.). A second display rank may be identified for the second user based upon the second current user content interest and/or other information (e.g., a time at which the tablet primary device connected to the television secondary device, thus indicating an order with which the spouse entered the living room, such as relative to the first user; a time span over which the spouse has current priority to display renderings on the television secondary display, such as relative to the first user; a number of renderings displayed on the television secondary display by the spouse; etc.). Responsive to the first display rank exceeding the second display rank (e.g., the spouse may have spent a substantial amount of time within the last hour displaying renderings of content on the television secondary display, and thus it may be the first user's turn to display content), the rendering of the content may be projected onto the secondary display. Responsive to the second display rank exceeding the first display rank, the second primary device may project a second rendering for the second user to the secondary display and the primary device may wait until the secondary display is available (e.g., the spouse may gain priority to display renderings of content on the television secondary display based upon the spouse being the most recent person to enter into the living room and/or connect to the television secondary device). At 112, the method ends.

Figure 2A:
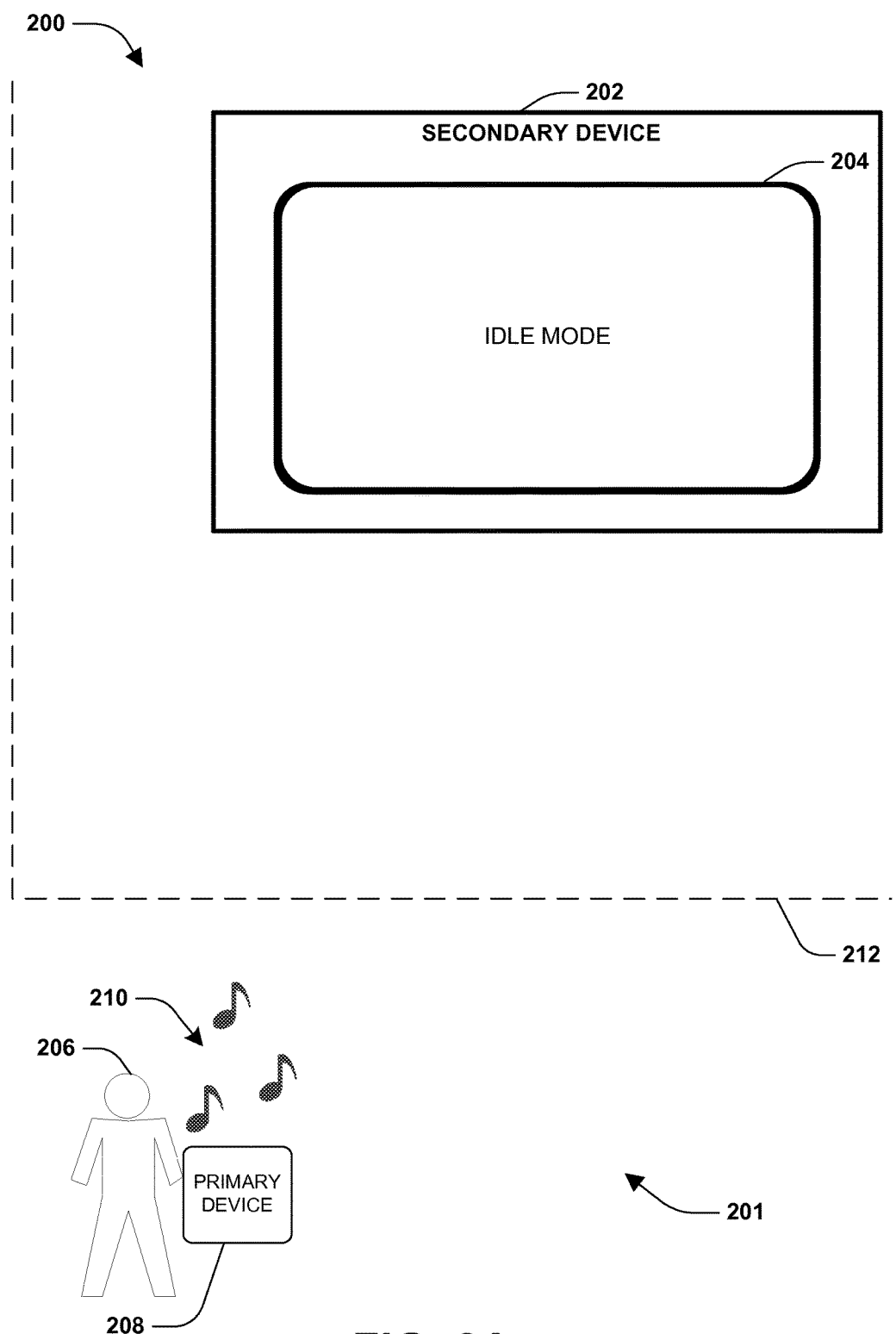
FIG. 2A is a component block diagram illustrating an exemplary system for content projection.
Figure 2B:
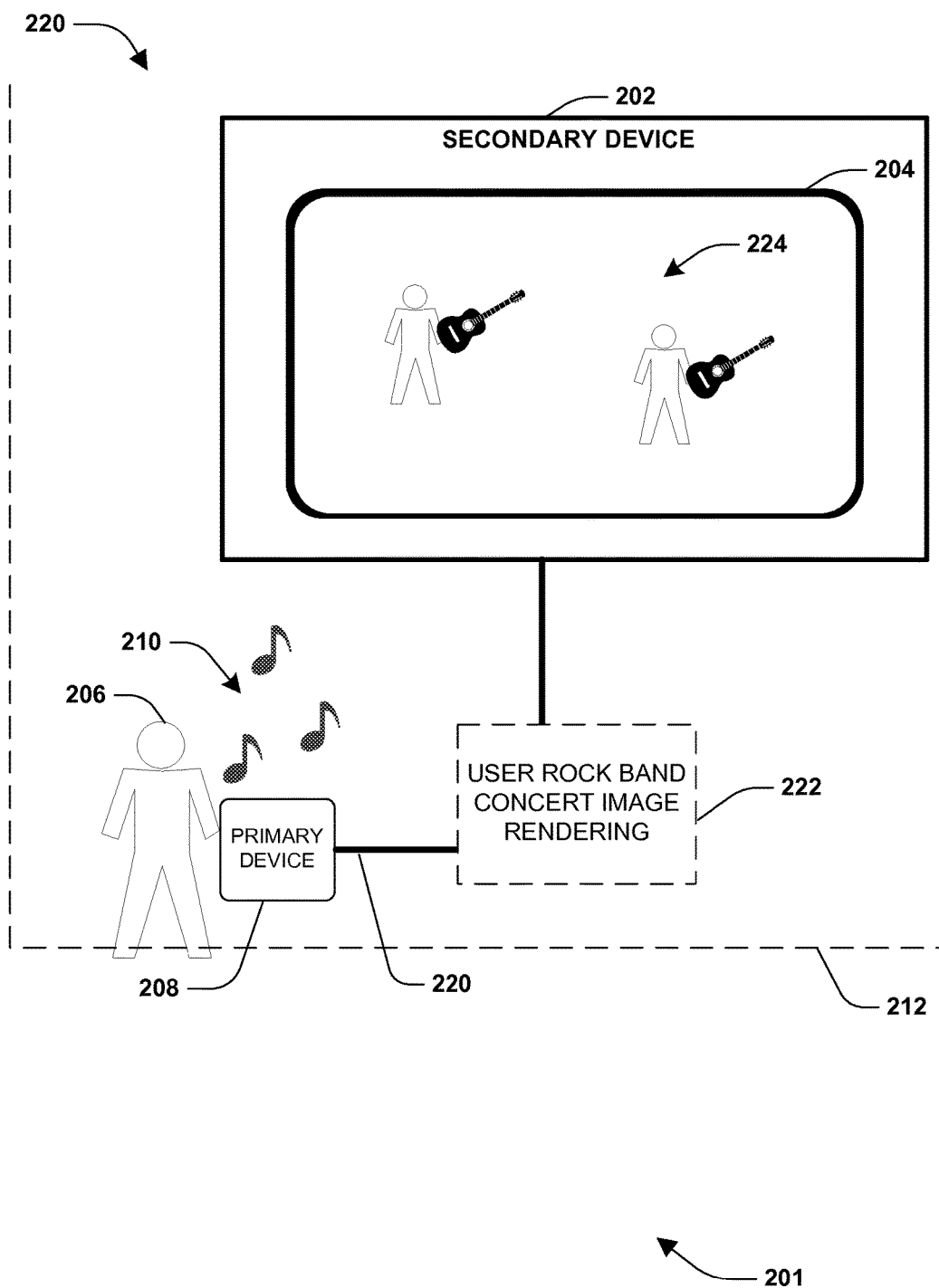
FIG. 2B is a component block diagram illustrating an exemplary system for content projection of imagery.
Figure 2C:
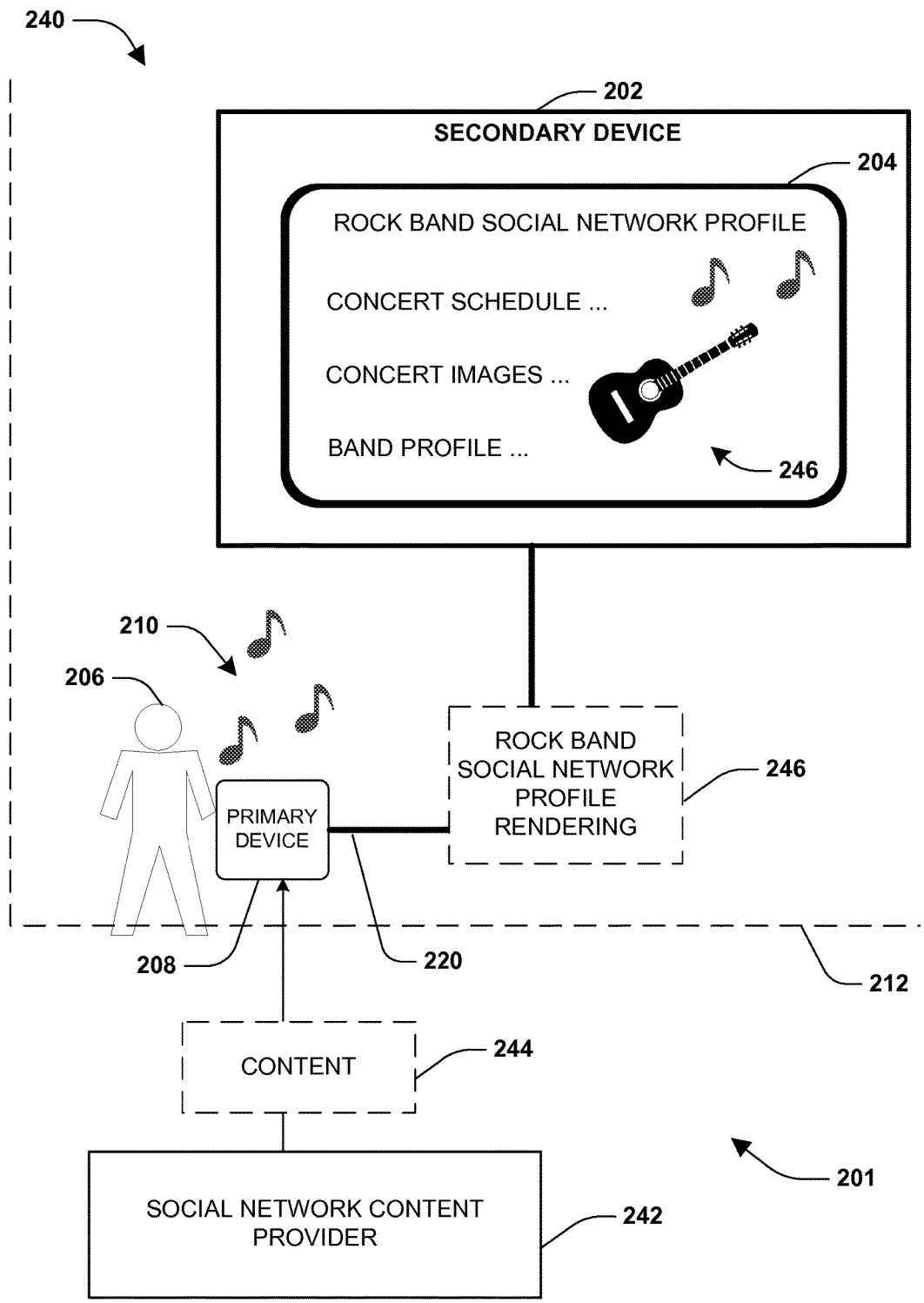
FIG. 2C is a component block diagram illustrating an exemplary system for content projection of social network data.

FIGS. 2A-2C illustrate examples of a system 201, comprising a primary device 208, for content projection. FIG. 2A illustrates an example 200 of a first user 206 listening to a Rock Band song 210 on the primary device 208. The primary device 208 may be greater than a threshold distance 212 from a secondary device 202 comprising a secondary display 204 that is in an idle mode. FIG. 2B illustrates an example 220 of a projection triggering event triggering based upon the primary device 208 being within the threshold distance 212 from the secondary device 202. The primary device 208 may establish a communication connection 220 with the secondary device 202. The primary device 208 may identify a first current user content interest of the first user 206 as a view Rock Band user images intent based upon the first user 206 recently attending a Rock Band concert (e.g., a calendar entry may indicate that the first user 206 recently attended the Rock Band concert) and/or based upon the first user 206 listening to the Rock Band song 210. The primary device 208 may obtain content, such as a first Rock Band user image 224 locally stored on the primary device 208, a second Rock Band user image remotely retrieved from a social network post of the first user 206, a third Rock Band user image retrieved from an email that a friend sent the first user 206, and/or other Rock Band user images associated with the first current user content interest. The primary device 208 may project a rendering 222 of the content, such as the first Rock Band user image 224, onto the secondary display 204 (e.g., the primary device 208 may locally generate the rendering 222, and may send the rendering 222 over the communication connection 220 to the secondary device 202 for display on the secondary display 204). In this way, one or more Rock Band user images may be projected onto the secondary display 204.

FIG. 2C illustrates an example 240 of the primary device 208 identifying a second current user content interest of the first user 206. For example, the primary device 208 may determine that the first user 206 has an interest in viewing a Rock Band social network profile based upon a user command "show me the social network for the band that is playing right now". The primary device 208 may obtain content 244, such as Rock Band social network profile content, from a remote social network content provider 242. The primary device 208 may project a second rendering 246 of the content 244 onto the secondary display 204 (e.g., the primary device 208 may locally generate the second rendering 246, and may provide the second rendering 246 over the communication connection 220 to the secondary device 202 for display on the secondary display 204).

Figure 3A:
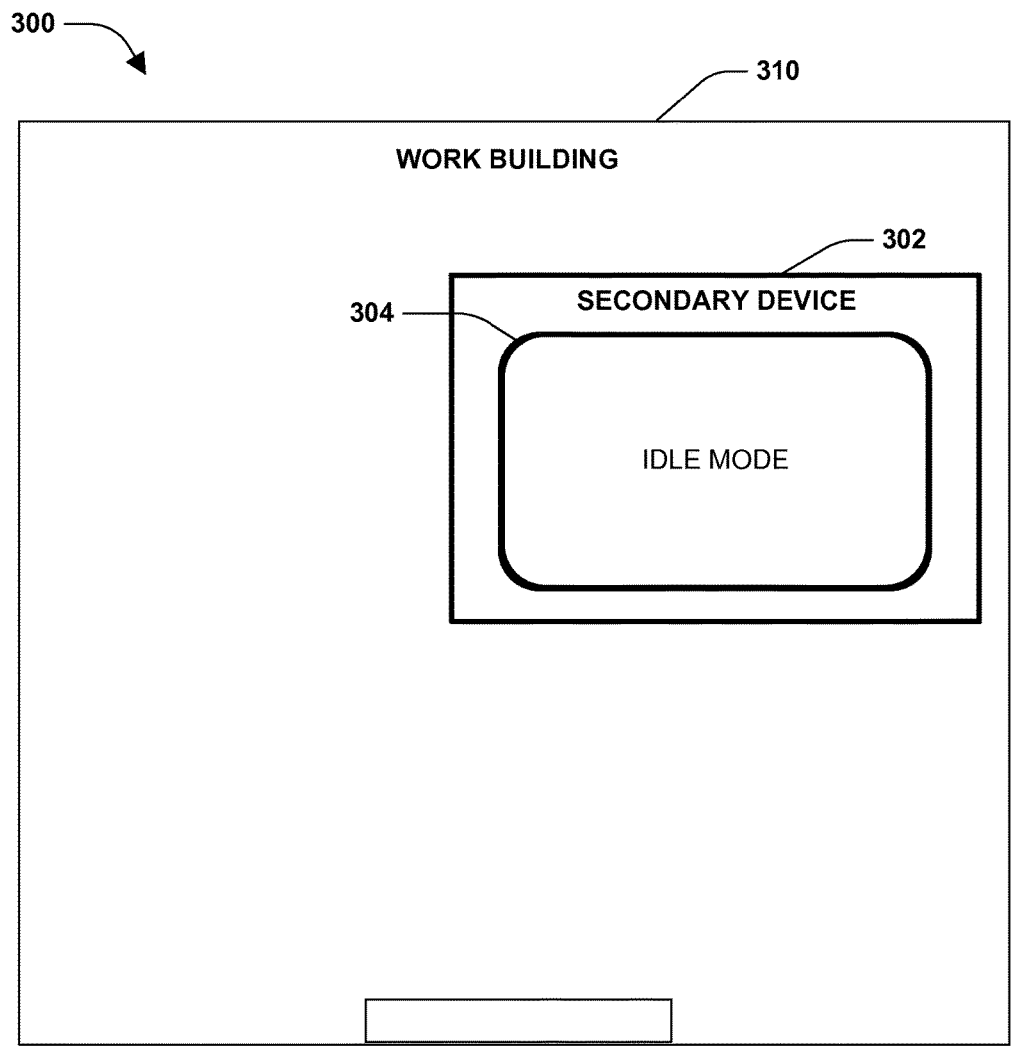
FIG. 3A is a component block diagram illustrating an exemplary system for content projection.
Figure 3A:

FIGS. 3A-3D illustrate examples of a system 301, comprising a primary device 308, for content projection. FIG. 3A illustrates an example 300 of a first user 306, carrying the primary device 308 (e.g., a mobile phone) standing outside a work building 310 at which the first user 306 works. A secondary device 302, comprising a secondary display 304 (e.g., a touch enabled device in an idle mode), may be located within the work building 310.

Figure 3B:
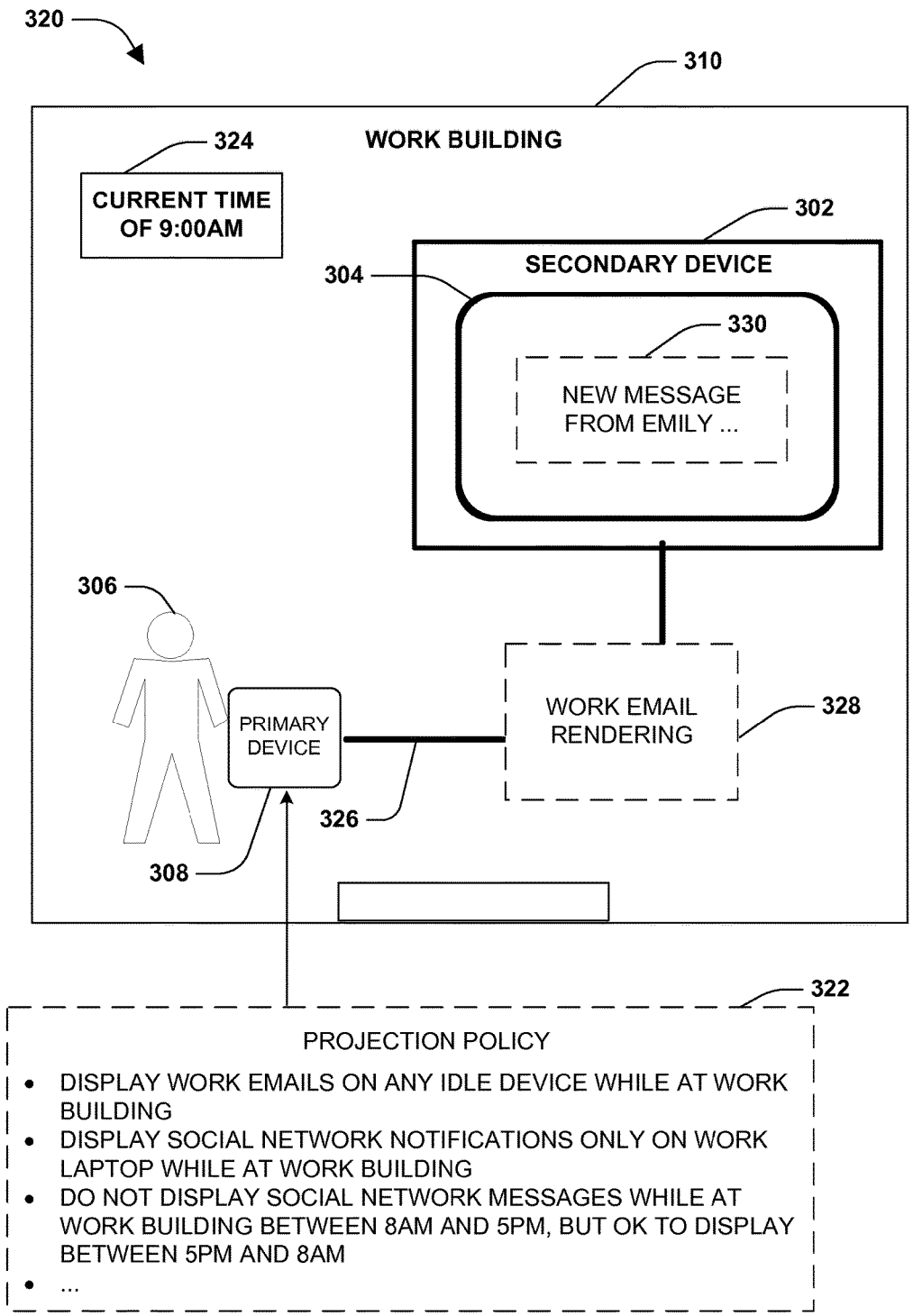
FIG. 3B is a component block diagram illustrating an exemplary system for content projection of email data based upon a projection policy.

FIG. 3B illustrates an example 320 of a projection triggering event triggering based upon the primary device 308 being within a communication range of the secondary device 302. The primary device 308 may establish a communication connection 326 with the secondary device 302. The primary device 308 may identify a first current user content interest of the first user 306, such as an interest in viewing work emails, social network notifications, and/or social network messages (e.g., prior user behavior may indicate that the first user 306 generally checks communication content while in the work building 310).

The primary device 308 may maintain a projection policy 322 associated with the first user 306. The projection policy 322 may specify that work emails can be displayed on any idle device at the working building 310, that social network notifications can be displayed only on the user's work laptop at the work building 310, that social network messages are not to be displayed at the work building 310 between 8:00 am and 5:00 pm but are ok to display between 5:00 pm and 8:00 am, etc. Accordingly, the primary device 308 may determine that work emails are ok to project onto the secondary display 304 of the second device 302, but that social network notifications (e.g., because the secondary device 302 is not the user's work laptop) and social network messages (e.g., because the current time is 9:00 am) are not ok to project onto the secondary display 304. The primary device 308 may obtain new work email message content 330. Given that the new work email message content 330 corresponds to a work email, and thus satisfies the projection policy, the primary device 308 may project a first rendering 328 of the new work email message content 330 onto the secondary display 304 (e.g., the primary device 308 may locally generate the first rendering 328, and may provide the first rendering 328 over the communication connection 326 to the secondary device 302 to display on the secondary display 304).

Figure 3C:
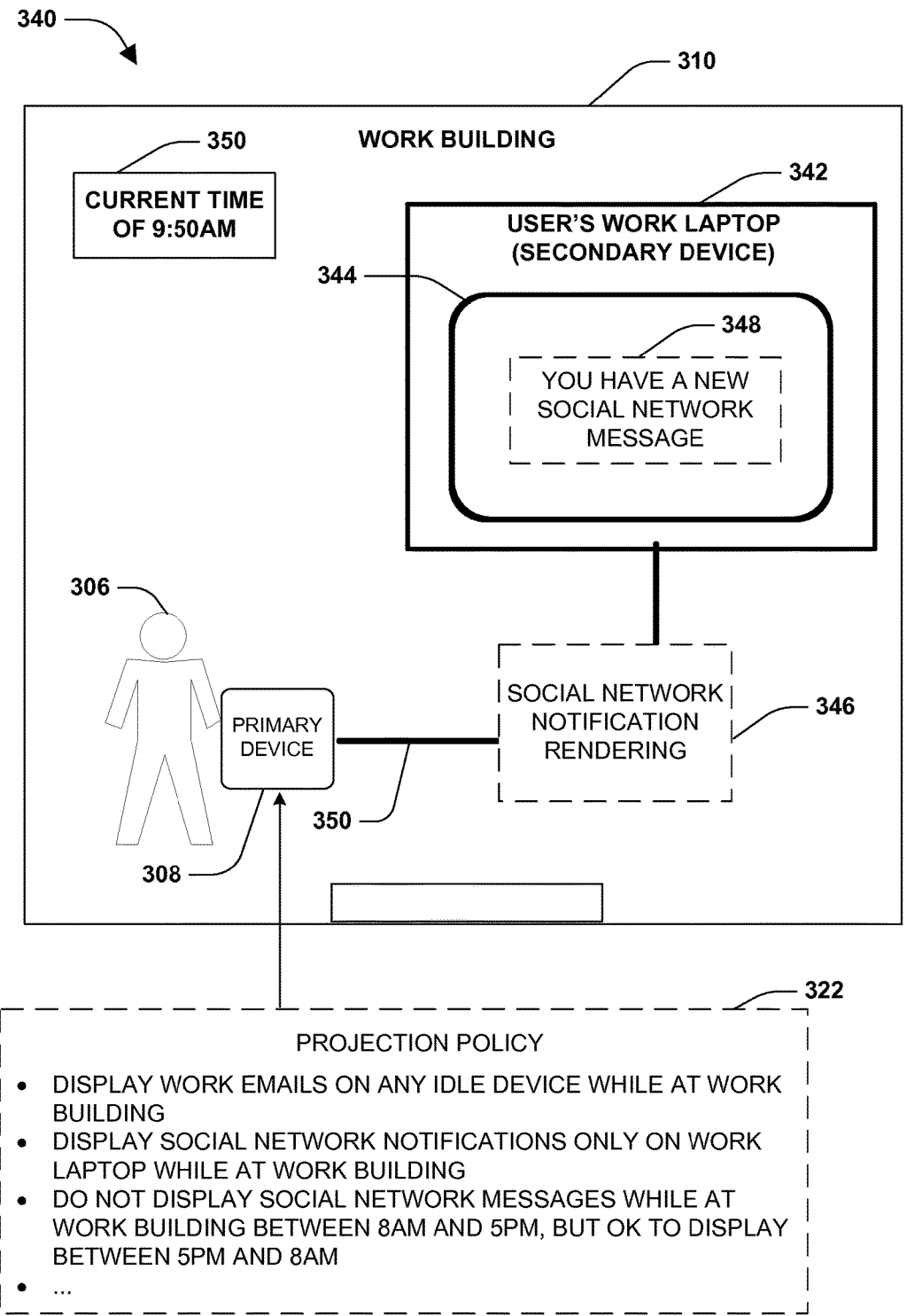
FIG. 3C is a component block diagram illustrating an exemplary system for content projection of social network notification data based upon a projection policy.

FIG. 3C illustrates an example 340 of the primary device 308 projecting a second rendering 346 of social network notification content 348 onto a laptop display 344 of the user's work laptop 342. The primary device 308 may establish a communication connection 350 with the user's work laptop 342. For example, the primary device 308 may determine that the social network notification content 348 is allowed to be displayed through the user's work laptop 342 at a current time 350 of 9:50 am based upon the projection policy 322 specifying that social network notifications are allowed to be displayed only on the user's work laptop 342 while at the work building 310. Accordingly, the primary device 308 may obtain the social network notification content 348 from a social network service. The primary device 308 may project the second rendering 346 of the social network notification content 348 onto the laptop display 344 of the user's work laptop 342 (e.g., the primary device 308 may locally generate the second rendering 346, and may provide the second rendering 346 over the communication connection 350 to the user's work laptop 342 to display on the laptop display 344).

Figure 3D:
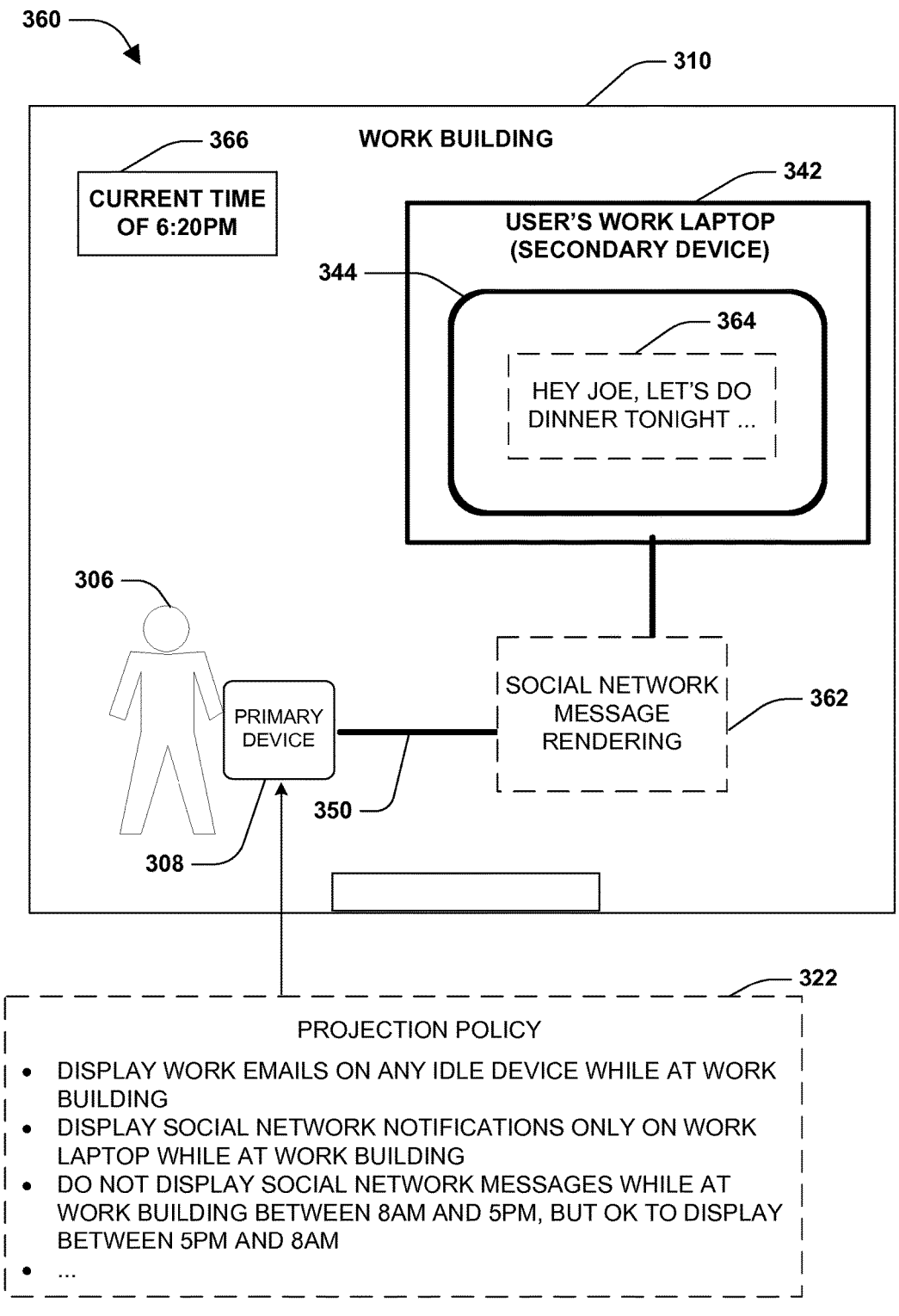
FIG. 3D is a component block diagram illustrating an exemplary system for content projection of social network message data based upon a projection policy.

FIG. 3D illustrates an example 360 of the primary device 308 projecting a third rendering 362 of social network message content 364 onto the laptop display 344 of the user's work laptop 342. For example, the primary device 308 may determine that the social network message content 364 is allowed to be displayed through the user's work laptop 342 at a current time 366 of 6:20 pm based upon the projection policy 322 specifying that social network messages may be displayed between 5:00 pm and 8:00 am. Accordingly, the primary device 308 may obtain the social network message content 364 from a social network service. The primary device 308 may project the third rendering 362 of the social network message content 364 onto the laptop display 344 of the user's work laptop 342 (e.g., the primary device 308 may locally generate the third rendering 362, and may provide the third rendering 362 over the communication connection 350 to the user's work laptop 342 to display on the laptop display 344).

Figure 4A:
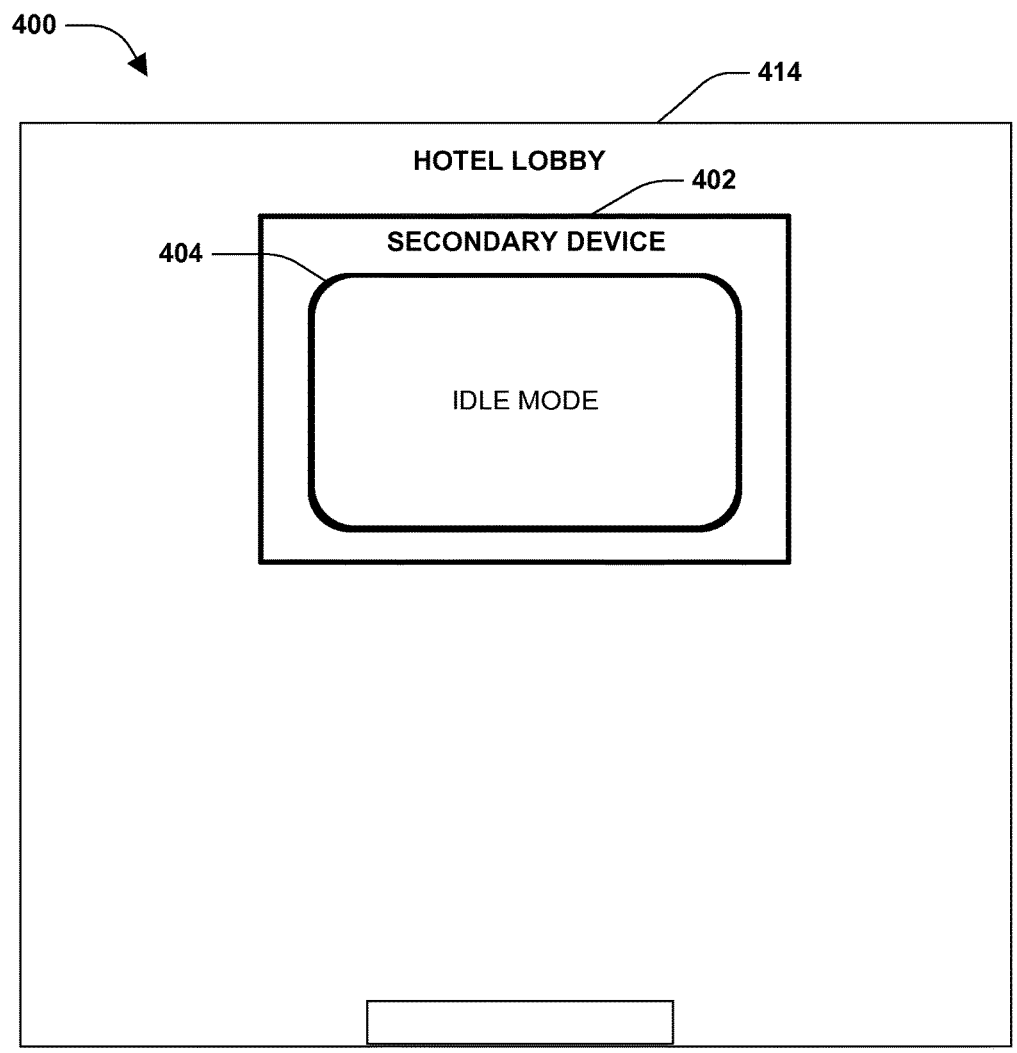
FIG. 4A is a component block diagram illustrating an exemplary system for content projection.
Figure 4A:
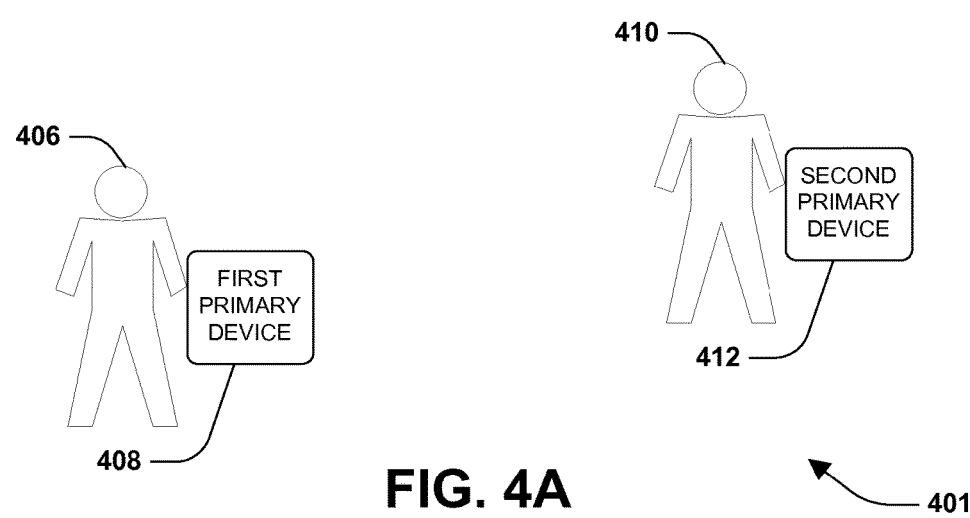

FIGS. 4A-4E illustrate examples of a system 401, comprising a secondary device 402, configured for content projection. FIG. 4A illustrates an example 400 of the secondary device 402 (e.g., a television) being located in a hotel lobby 414. A first user 406 of a first primary device 408 and a second user 410 of a second primary device 412 may be located outside the hotel lobby 414 (e.g., outside a communication range with respect to the secondary device 402).

Figure 4B:
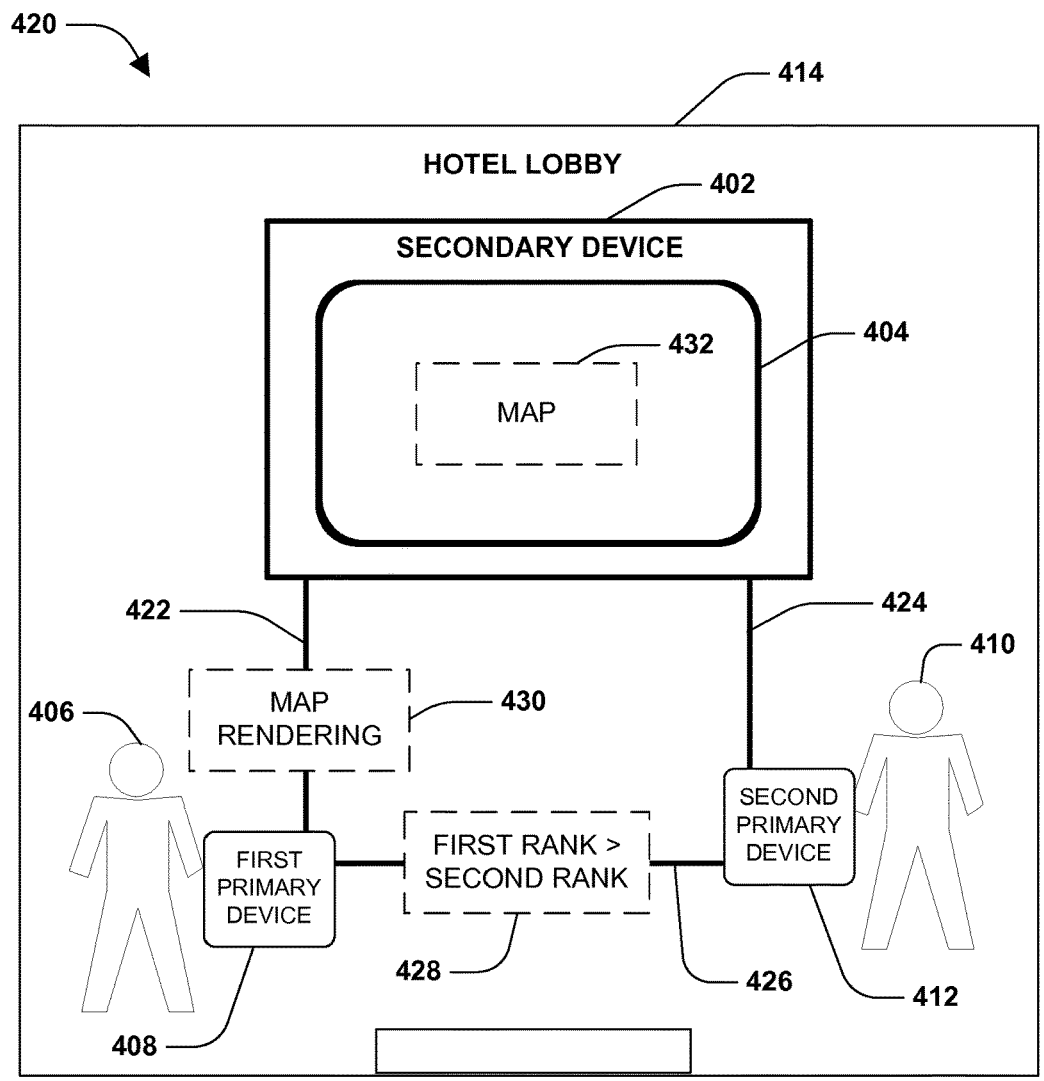
FIG. 4B is a component block diagram illustrating an exemplary system for content projection of content.

FIG. 4B illustrates an example 420 of the secondary device 402 establishing a first communication connection 422 with the first primary device 408 and a second communication connection 424 with the second primary device 412. In an example, the secondary device 402 may provide a secondary device identifier, identifying the secondary device 402, to the first primary device 408 and/or the second primary device 412 (e.g., a primary device may utilize the secondary device identifier to determine what content may be allowed or not allowed to be displayed through the secondary device 402). In an example, the first primary device 408 and the second primary device 412 may establish a communication channel 426 over which the first primary device 408 and the second primary device 412 may collaborate 428 to determine which primary device has current priority to project renderings of content onto a secondary display 404 of the secondary device 402. For example, the first primary device 408 may identify a first rank for the first user 406 and the second primary device 412 may identify a second rank for the second user 410 (e.g., a rank assigned based upon the most recent user to establish a communication connection with the secondary device 402; a rank assigned based upon a utilization metric where the rank increases or decreases as more renderings are projected by a primary device to the secondary display 404; a rank assigned based upon content that is to be displayed on the secondary display 404; etc.). Responsive to the first rank exceeding the second rank, the first primary device 408 may project a first rendering 430 of content associated with a first current user content interest of the first 406, such as map content 432. The secondary device 402 may receive the first rendering 430 over the first communication connection 422, and may display the first rendering 430 on the secondary display 404.

Figure 4C:
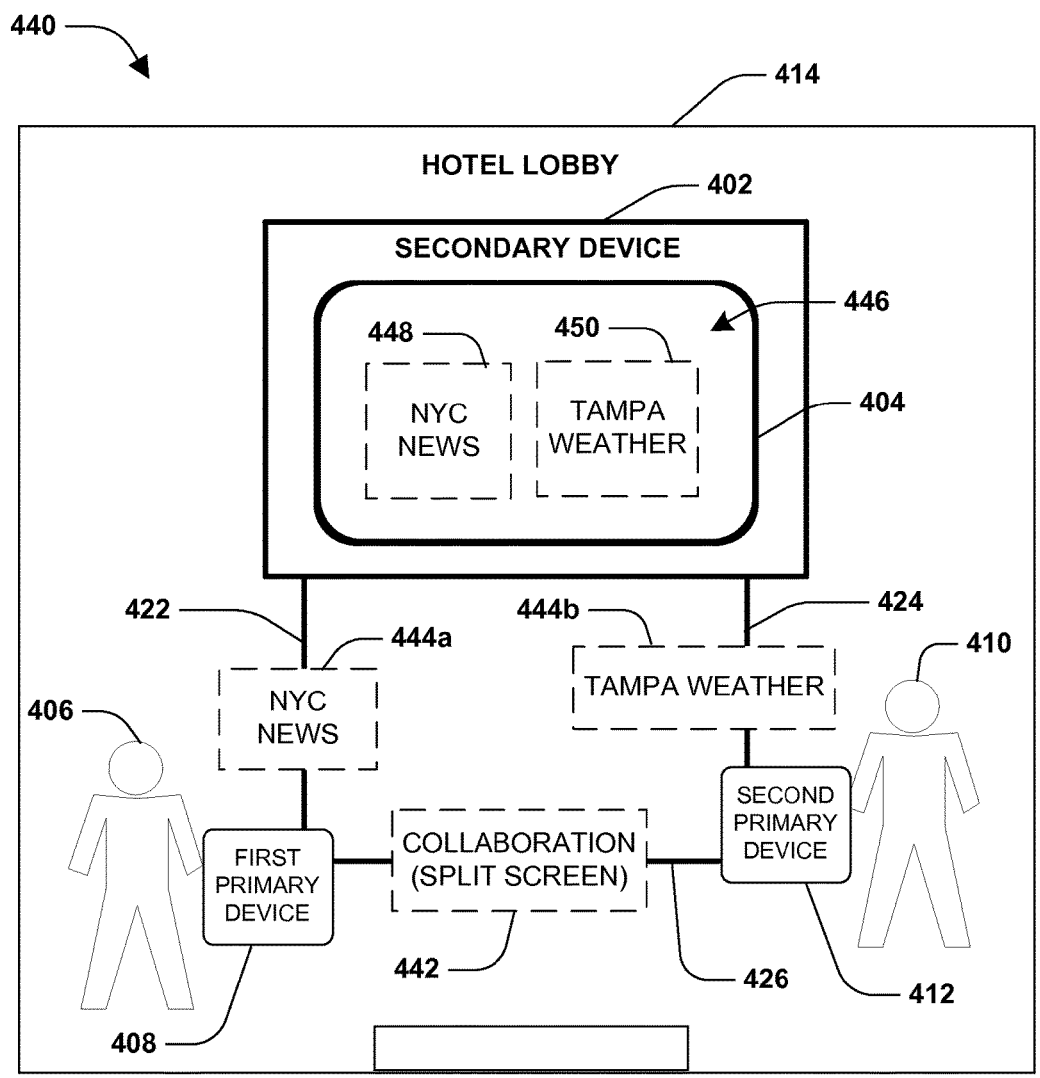
FIG. 4C is a component block diagram illustrating an exemplary system for content projection of a collaborative rendering as a split screen user interface.

FIG. 4C illustrates an example 440 of the secondary device 402 displaying a collaborative rendering 446 as a split screen user interface. In an example, the first primary device 406 and the second primary device 412 may collaborate 442 over the communication connection 426 to determine that the first user 406 has an interest in NYC news content 448 and that the second user 410 has an interest in Tampa weather content 450. The secondary device 402 may receive a first split screen user interface portion 444a of the collaborative rendering 446 (e.g., the NYC news content 448) from the first primary device 408. The secondary device 402 may receive a second split screen user interface portion 444b of the collaborative rendering 446 (e.g., the Tampa weather content 450) from the second primary device 412. It may be appreciated that the secondary device 402 may obtain the collaborative rendering 446 in various manners, such as receiving the entire collaborative rendering 446 from merely the first primary device 408 or merely the second primary device 412, the secondary device 402 may generate the collaborative rendered 446 based upon the NYC news content 448 and the Tampa weather content 450, etc. In this way, the collaborative rendering 446, comprising content that may be interesting to both the first user 406 and the second user 410, may be displayed through the secondary display 404 of the secondary device 402.

Figure 4D:
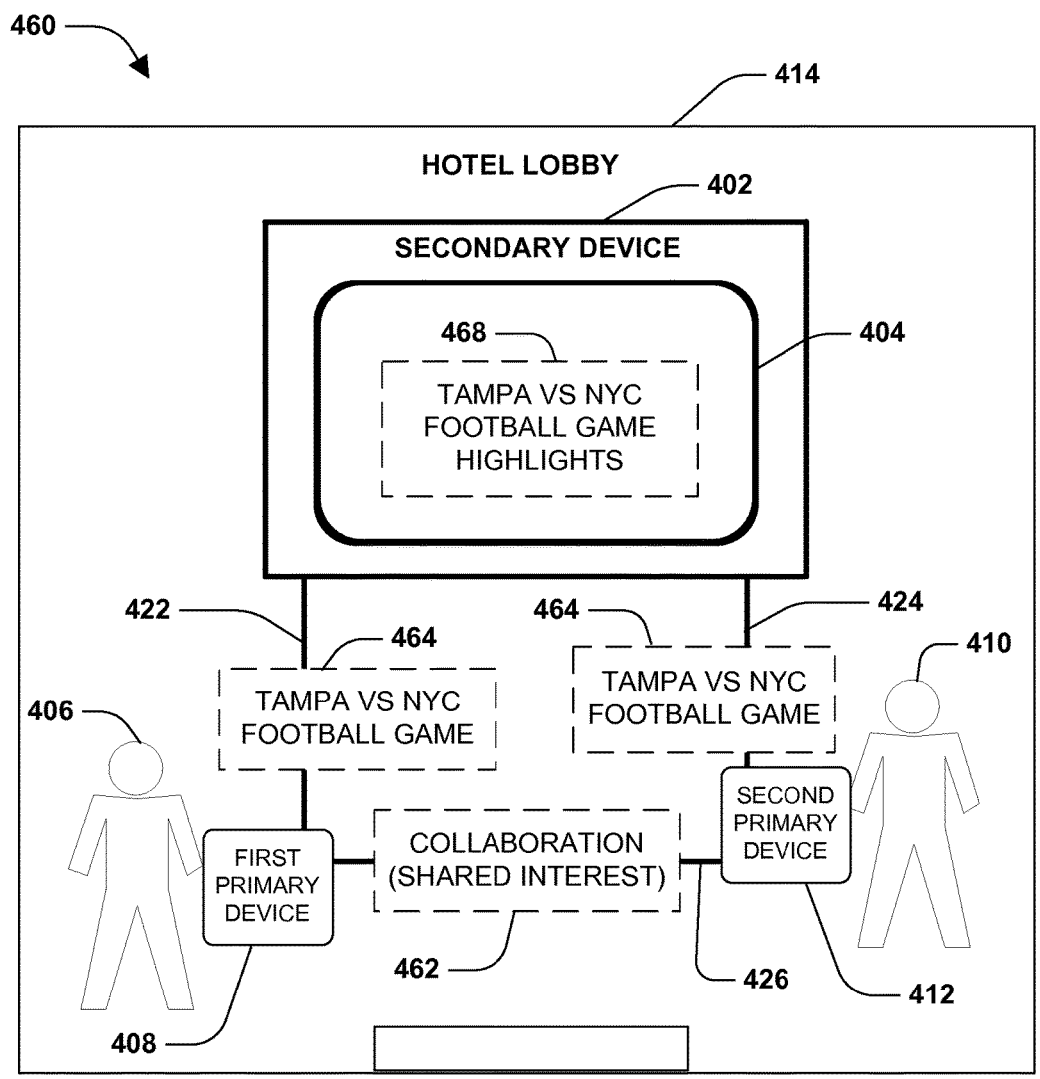
FIG. 4D is a component block diagram illustrating an exemplary system for content projection of content that is a shared interest between multiple users.

FIG. 4D illustrates an example 460 of the secondary device 402 displaying a collaborative rendering 468 of content corresponding to a shared interest between the first user 406 and the second user 410. In an example, the first primary device 406 and the second primary device 412 may collaborate 462 over the communication connection 426 to determine that the first user 406 and the second user 410 have a shared interest in sports based upon the first user 406 having an interest in NYC sports content and the second user 410 having an interest in Tampa sports content. The secondary device 402 may receive a shared interest rendering 464 of shared interest content, such as a Tampa verse NYC football game highlights 468, from the first primary device 408 and/or the second primary device 412. In this way, the shared interest rendering 464, comprising shared interest content that may be interesting to both the first user 406 and the second user 410, may be displayed through the secondary display 404 of the secondary device 402.

Figure 4E:
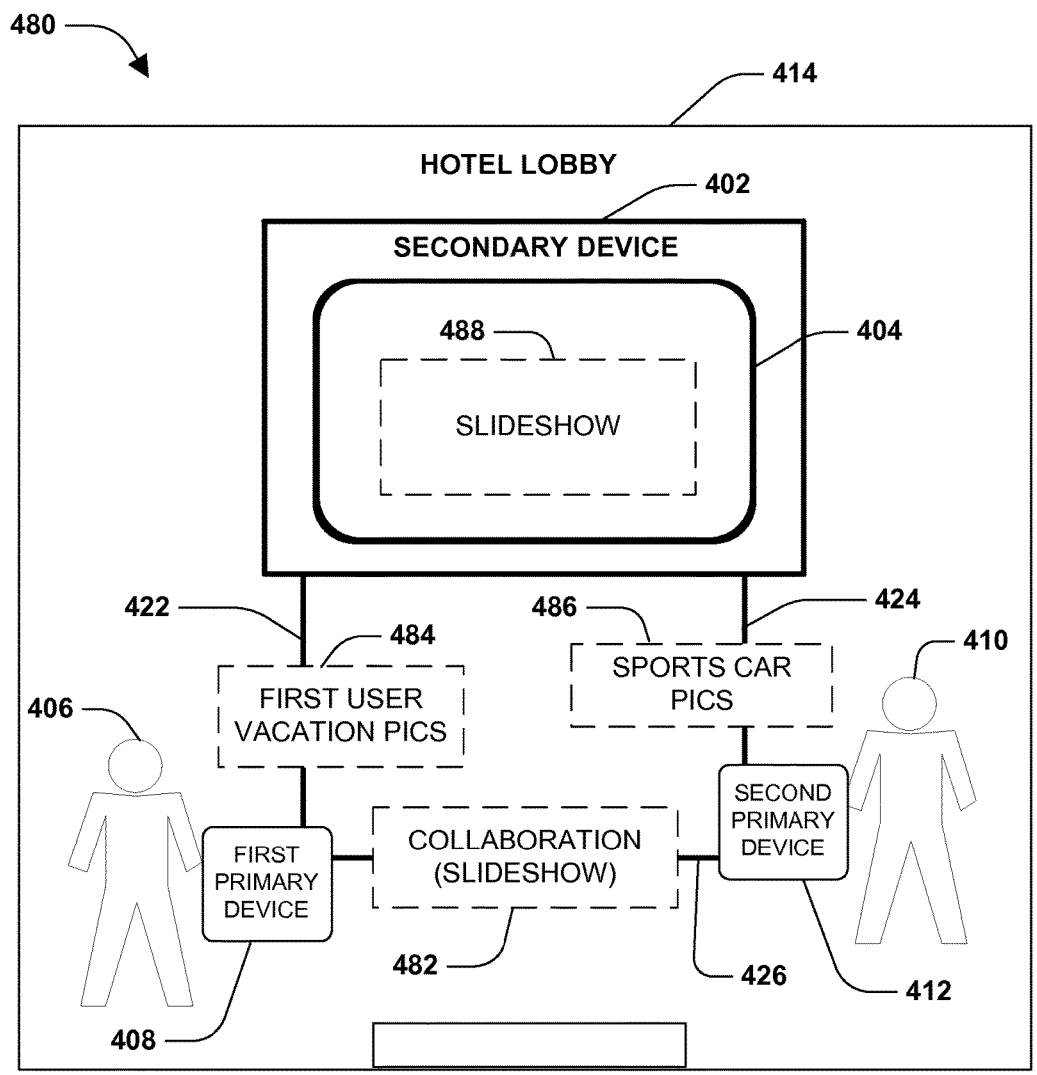
FIG. 4E is a component block diagram illustrating an exemplary system for content projection of a collaborative rendering as a slideshow.

FIG. 4E illustrates an example 480 of the secondary device 402 displaying a collaborative rendering as a slide show 488. In an example, the first primary device 406 and the second primary device 412 may collaborate 482 over the communication connection 426 to determine that the first user 406 has an interest in viewing vacation picture content 484 and that the second user 410 has an interest in viewing sports car picture content 486. The secondary device 402 may receive the vacation picture content 484 from the first primary device 406. The secondary device 402 may receive the sports car picture content 486 from the second primary device 412. The secondary device 402 may display the vacation picture content 484 interleaved with the sports car picture content 486 as the slideshow 488 through the secondary display 404 of the secondary device 402.

According to an aspect of the instant disclosure, a system for content projection is provided. The system includes a primary device. The primary device is configured to establish a communication connection with a secondary device. The primary device is configured to identify a first current user content interest of a first user of the primary device. The primary device is configured to obtain content associated with the first current user content interest. The primary device is configured to project a rendering of the content onto a secondary display of the secondary device.

According to an aspect of the instant disclosure, a system for content projection is provided. The system includes a secondary device. The secondary device is configured to establish a communication connection with a primary device. The secondary device is configured to provide a secondary device identifier, identifying the secondary device, to the primary device. The secondary device is configured to receive a first rendering of content, associated with a first current user content interest of a first user of the primary device, from the primary device based upon the secondary device identifier satisfying a projection policy. The secondary device is configured to display the first rendering on a secondary display of the secondary device.

According to an aspect of the instant disclosure, a method for content projection is provided. The method includes establishing a communication connection between a primary device and a secondary device. A first current user content interest of a first user of the primary device is identified. Content, associated with the first current user content interest, is obtained. A rendering of the content is projected onto a secondary display of the secondary device.

According to an aspect of the instant disclosure, a means for content projection is provided. A communication connection is established between a primary device and a secondary device, by the means for content projection. A first current user content interest of a first user of the primary device is identified, by the means for content projection. Content, associated with the first current user content interest, is obtained, by the means for content projection. A rendering of the content is projected onto a secondary display of the secondary device, by the means for content projection.

According to an aspect of the instant disclosure, a means for content projection is provided. A communication connection is established between a primary device and a secondary device, by the means for content projection. A secondary device identifier, identifying the secondary device, is provided to the primary device, by the means for content projection. A first rendering of content, associated with a first current user content interest of a first user of the primary device, is received by the means for content projection from the primary device based upon the secondary device identifier satisfying a projection policy. The first rendering is displayed on a secondary display of the secondary device, by the means for content projection.

Figure 5:
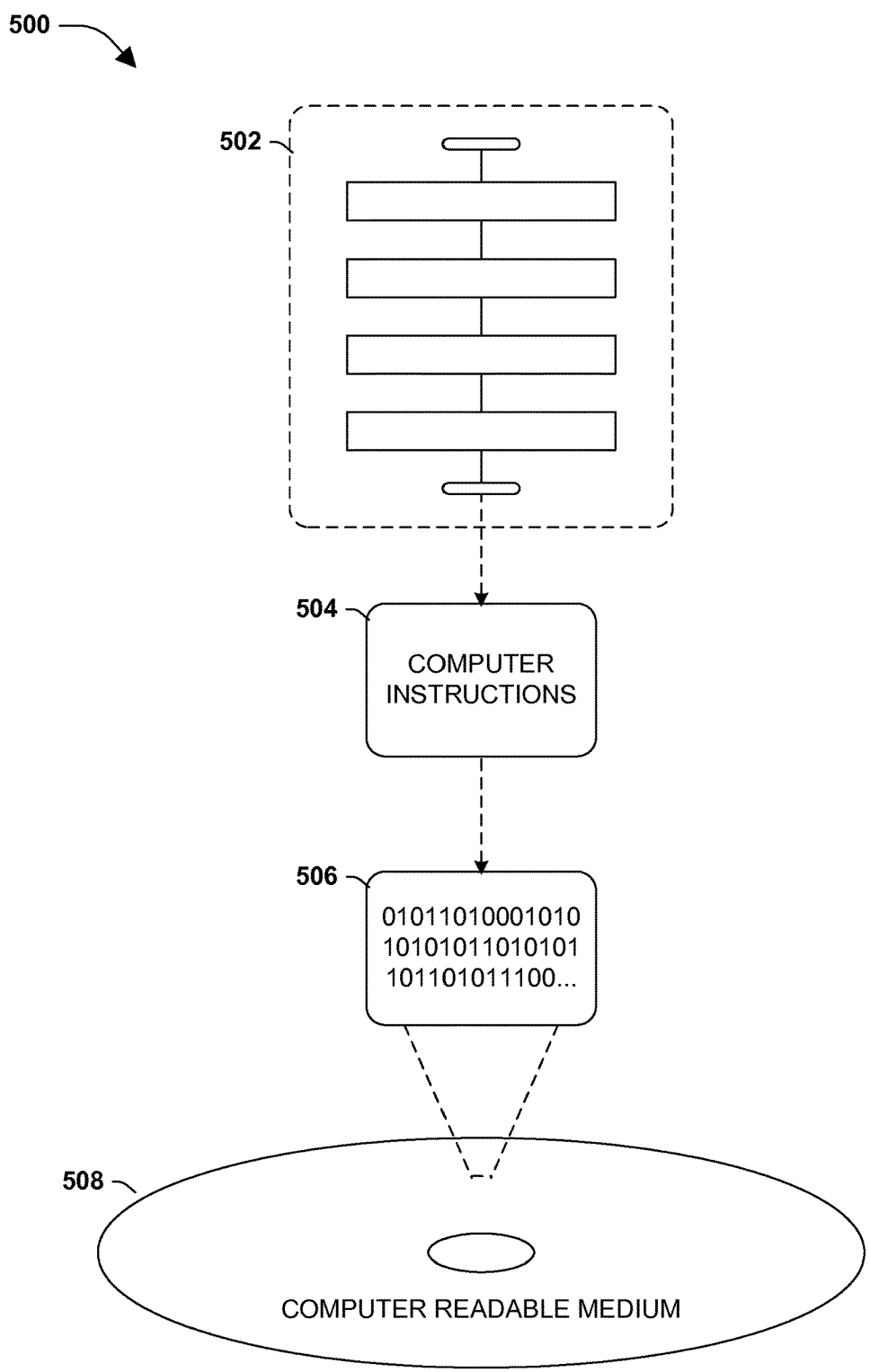
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, for example. In some embodiments, the processor-executable instructions 504 are configured to implement a system, such as at least some of the exemplary system 201 of FIGS. 2A-2C, at least some of the exemplary system 301 of FIGS. 3A-3D, and/or at least some of the exemplary system 401 of FIGS. 4A-4E, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
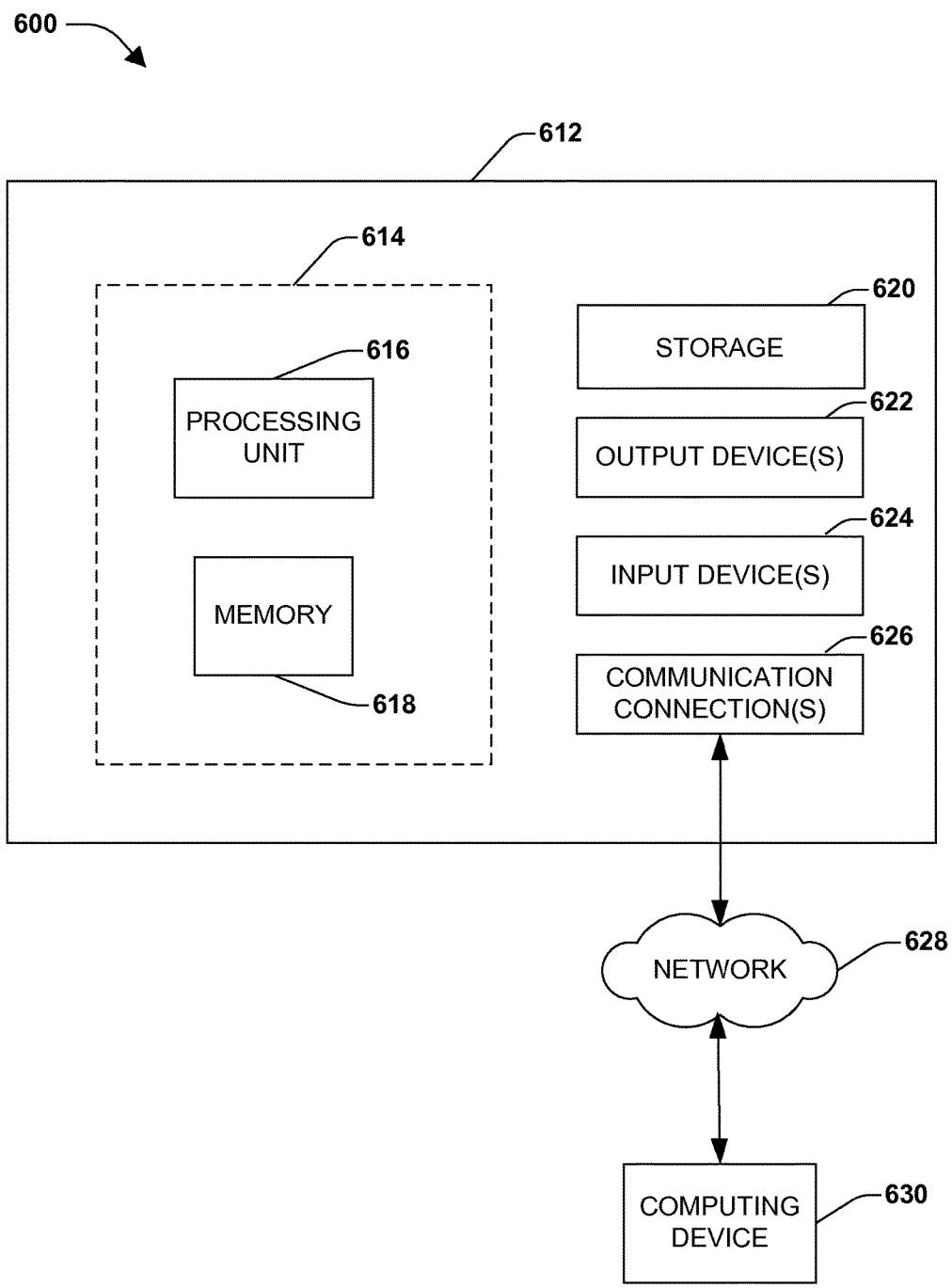
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for content projection, comprising:
a primary device configured to:
establish a communication connection with a secondary device;
receive a projection policy, wherein the projection policy specifies whether a content type is allowed to be projected, and the projection policy specifies that the content type is allowed to be projected during a recurring specified time range or the projection policy specifies that the content type is not allowed to be projected during the recurring specified time range;
identify a first current user content interest of a first user of the primary device;
obtain content associated with the first current user content interest;
create a rendering of the content locally on the primary device; and
determine that a current context satisfies the projection policy that specifies whether the content type is allowed to be projected; and
responsive to determining that the current context satisfies the projection policy, project by the primary device, the rendering of the content onto a secondary display of the secondary device, wherein projecting the rendering comprises sending the rendering from the primary device to the secondary device over the communication connection.

2. The system of claim 1, the primary device configured to:
obtain the content from at least one of local primary storage on the primary device or a remote source not comprised on the secondary device.

3. The system of claim 1, the rendering not displayed on a primary display of the primary device.

4. The system of claim 1, the primary device configured to:
define a projection triggering event based upon at least one of a proximity distance between the primary device and the secondary device, an idle mode of the secondary device, a user command, or a location trigger; and
responsive to a triggering of the projection triggering event, project the rendering of the content onto the secondary display.

5. The system of claim 1, the projection policy specifying a content type that is allowed to be projected onto a device type of the secondary device.

6. The system of claim 1, the projection policy specifying a content type that is not allowed to be projected onto a device type of the secondary device.

7. The system of claim 1, the projection policy specifying at least one of a first content type that is allowed to be projected at a specified geographical location or a second content type that is not allowed to be projected at the specified geographical location.

8. The system of claim 1, the primary device configured to:
detect a second primary device of a second user;
collaborate with the second primary device to obtain a set of content associated with the first current user content interest and a second current user content interest of the second user; and
project a collaborative rendering of the set of content onto the secondary display, wherein projecting the collaborative rendering comprises sending the collaborative rendering from the primary device to the secondary device over the communication connection.

9. The system of claim 8, wherein the content comprises first content, the rendering comprises a first rendering, and the primary device is configured to:
receive a second rendering from the second primary device of the second user;
generate the collaborative rendering as a split screen user interface comprising a first user interface portion populated with the first content, of the set of content, corresponding to the first current user content interest of the first user and a second user interface portion populated with second content comprising the second rendering received from the second primary device of the second user, of the set of content, corresponding to the second current user content interest of the second user.

10. The system of claim 8, the primary device configured to:
generate the collaborative rendering as a slideshow user interface comprising first content, of the set of content, corresponding to the first current user content interest of the first user interleaved with second content, of the set of content, corresponding to the second current user content interest of the second user.

11. The system of claim 8, the set of content comprising first content corresponding to both the first current user content interest and the second current user content interest.

12. The system of claim 1, the primary device configured to:
detect a second primary device of a second user;
receive a second current user content interest of the second user from the second primary device;
identify a first display rank for the first user based upon the first current user content interest;
identify a second display rank for the second user based upon the second current user content interest; and responsive to the first display rank exceeding the second display rank, project the rendering of the content onto the secondary display.

13. The system of claim 1, the primary device configured to:
   responsive to potential content exceeding a user sensitivity threshold, disqualify the potential content for projection, as the rendering, onto the secondary display, wherein the user sensitivity threshold indicates a secrecy level.

14. The system of claim 1, the content comprising at least one of an image, a video, a website, audio, email content, calendar content, social network content, a file, text, a map, web service result data, weather, a recommendation from a recommendation service, task completion information, or a document.

15. A computer-readable medium comprising processor-executable instructions causing a computing-system to perform a method for content projection, comprising:
   establishing a communication connection between a primary device and a secondary device;
   receiving a projection policy, wherein the projection policy specifies whether a content type is allowed to be projected, and the projection policy specifies that the content type is allowed to be projected during a recurring specified time range or the projection policy specifies that the content type is not allowed to be projected during the recurring specified time range;
   identifying a first current user content interest of a first user of the primary device;
   obtaining content associated with the first current user content interest;
   create a rendering of the content locally on the primary device and
   responsive to determining that a current context satisfies the projection policy, over the communication connection with the secondary device, projecting the rendering of the content onto a secondary display of the secondary device.

16. A method for content projection comprising:
   establishing a communication connection between a primary device and a secondary device;
   identifying a current user content interest of a first user of the primary device;
   obtaining content associated with the current user content interest, wherein the content is obtained locally on the primary device;
   creating a rendering of the content locally on the primary device;
   receiving a projection policy, wherein the projection policy specifies a content type that is allowed to be projected only during a specified recurring time frame, and the projection policy specifies work or personal content;
   responsive to determining that a current time is within the specified time frame and thus satisfies the projection policy, projecting the rendering of the content onto a display of the secondary device over the communication connection with the secondary device.

17. The system of claim 1, wherein:
   a projection triggering event is defined based on a user voice command; and
   the rendering of the content is projected responsive to the user voice command of the projection triggering event.

18. The system of claim 1 wherein:
   the content type of the projection policy differentiates between work content and personal content.

* * * * *